United States Patent
Ullmann et al.

(10) Patent No.: US 7,415,038 B2
(45) Date of Patent: Aug. 19, 2008

(54) METHOD AND SYSTEM FOR NETWORK MANAGEMENT PROVIDING ACCESS TO APPLICATION BANDWIDTH USAGE CALCULATIONS

(75) Inventors: Lorin Evan Ullmann, Austin, TX (US); Ching-Jye Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1506 days.

(21) Appl. No.: 09/820,510

(22) Filed: Mar. 29, 2001

(65) Prior Publication Data

US 2002/0172222 A1    Nov. 21, 2002

(51) Int. Cl.
*H04J 3/16* (2006.01)
*G06F 15/173* (2006.01)

(52) U.S. Cl. .................... 370/468; 709/225
(58) Field of Classification Search ............ 370/468, 370/241; 709/225, 223, 224, 226
See application file for complete search history.

(56) References Cited

U.S. PATENT DOCUMENTS

| | | | |
|---|---|---|---|
| 5,390,182 A | 2/1995 | Zheng | 370/85.5 |
| 5,884,037 A | 3/1999 | Aras et al. | 395/200.56 |
| 5,983,261 A | 11/1999 | Riddle | 709/204 |
| 6,003,079 A | 12/1999 | Friedrich et al. | 709/224 |
| 6,324,184 B1 * | 11/2001 | Hou et al. | 370/468 |
| 2002/0093983 A1 * | 7/2002 | Newberg et al. | 370/468 |
| 2002/0129143 A1 * | 9/2002 | McKinnon et al. | 709/225 |

* cited by examiner

*Primary Examiner*—Huy D. Vu
(74) *Attorney, Agent, or Firm*—Duke W. Yee; Jeffrey S. LaBaw; Wayne P. Bailey

(57) ABSTRACT

A method, system, apparatus, and computer program product is presented for management of a distributed data processing system. The network management framework is able to monitor multiple sources of network packets on various subnets within the distributed data processing system; distributed packet snoopers are deployed from a packet usage manager to monitor the multiple sources of network packets. The system administrator can request packet filtering based upon selected active users or active applications. A bandwidth history database is compiled from bandwidth usage data associated with multiple entities within the data processing system, including users, applications, and/or endpoints within the data processing system. In response to a requested action within the data processing system, bandwidth usage for the requested action can be predicted with reference to the bandwidth history database. The actual and predicted bandwidth usage of requested actions can be displayed to the system administrator in real time.

10 Claims, 17 Drawing Sheets

```
Class DKSSnooperEvent {

AAO     Session;              // User, Application, Endpoint Route Information
    Vector  packetSizes;
    Int     TypeOfSnoopSession    // Packet Type = 1;
                                  // Small Packet Sizes Only = 2;
                                  // All Packets = 3
}

Class AAOSession { long          AAOSessionID;
    PacketFilter  p;
}

Class PacketFilter {

Endpoint   Route;
    int        SizeMinThreshold;
    int        SizeMaxThreshold;
    PacketType PacketTypeArray;   // type(s) of network protocol packets

}

Public Class Endpoint {

//public variables
    long         EPObjectID;  // ID to object (both private & public network addresses)
    InetAddress  EPIPAddress; // physical network address (private or public)
    long         EPVPN;       // virtual private network ID //get/set of variables
    public long        getObjectID( ) { ... }
    public InetAddress getIPAddress( ) { ... }
    public long        getVPN( ) { ... }
    .
    .
    .
}
```

*FIG. 7B*

Class BandwidthApplicationActionObject extends ApplicationActionObject {

BandwidthUsage   predictedBWUsage;  // Predicted bandwidth usage based on
                                                     //     selected category
   BandwidthUsage   actualBWUsage;    // Actual bandwidth usage
   User                u;

}

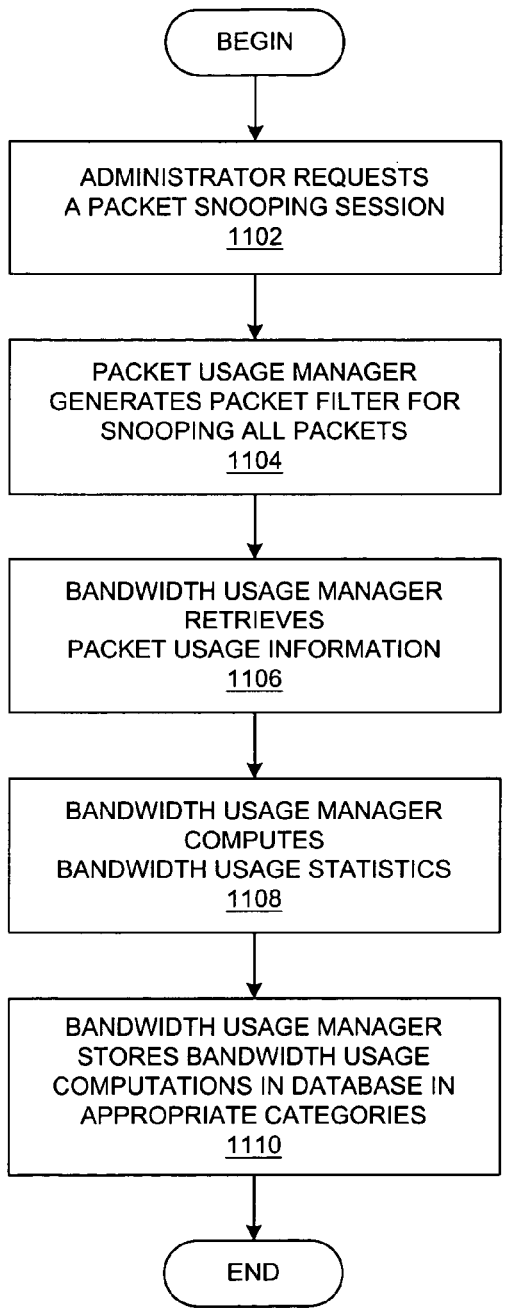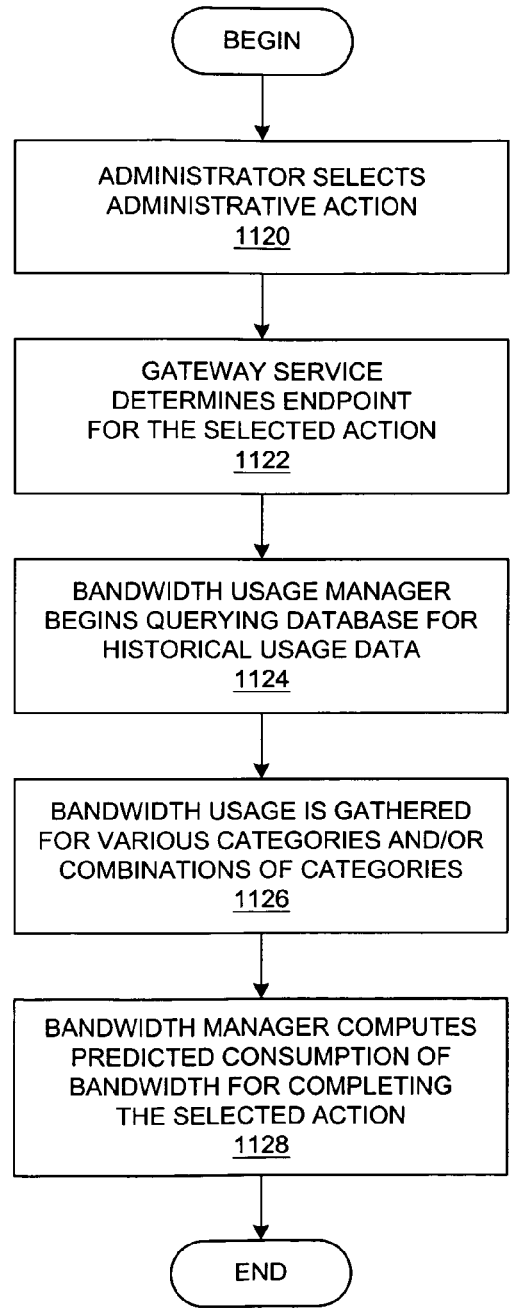
*FIG. 11A*                    *FIG. 11B*

METHOD AND SYSTEM FOR NETWORK MANAGEMENT PROVIDING ACCESS TO APPLICATION BANDWIDTH USAGE CALCULATIONS

CROSS-REFERENCE TO RELATED APPLICATIONS

The present application is related to the following application: application Ser. No. 09/820,502, filed Mar. 29, 2001, titled "Method and System for Network Management Capable of Identifying Sources of Small Packets".

BACKGROUND OF THE INVENTION

1. Field of the Invention

The present invention relates to an improved data processing system and, in particular, to a method and system for multiple computer or process coordinating. Still more particularly, the present invention provides a method and system for network management.

2. Description of Related Art

Technology expenditures have become a significant portion of operating costs for most enterprises, and businesses are constantly seeking ways to reduce information technology (IT) costs. This has given rise to an increasing number of outsourcing service providers, each promising, often contractually, to deliver reliable service while offloading the costly burdens of staffing, procuring, and maintaining an IT organization. While most service providers started as network pipe providers, they are moving into server outsourcing, application hosting, and desktop management. For those enterprises that do not outsource, they are demanding more accountability from their IT organizations as well as demanding that IT is integrated into their business goals. In both cases, "service level agreements" have been employed to contractually guarantee service delivery between an IT organization and its customers. As a result, IT teams now require management solutions that focus on and support "business processes" and "service delivery" rather than just disk space monitoring and network pings.

IT solutions now require end-to-end management that includes network connectivity, server maintenance, and application management in order to succeed. The focus of IT organizations has turned to ensuring overall service delivery and not just the "towers" of network, server, desktop, and application. Management systems must fulfill two broad goals: a flexible approach that allows rapid deployment and configuration of new services for the customer; and an ability to support rapid delivery of the management tools themselves. A successful management solution fits into a heterogeneous environment, provides openness with which it can knit together management tools and other types of applications, and a consistent approach to managing all of the IT assets.

With all of these requirements, a successful management approach will also require attention to the needs of the staff within the IT organization to accomplish these goals: the ability of an IT team to deploy an appropriate set of management tasks to match the delegated responsibilities of the IT staff; the ability of an IT team to navigate the relationships and effects of all of their technology assets, including networks, middleware, and applications; the ability of an IT team to define their roles and responsibilities consistently and securely across the various management tasks; the ability of an IT team to define groups of customers and their services consistently across the various management tasks; and the ability of an IT team to address, partition, and reach consistently the managed devices.

Many service providers have stated the need to be able to scale their capabilities to manage millions of devices. When one considers the number of customers in a home consumer network as well as pervasive devices, such as smart mobile phones, these numbers are quickly realized. Significant bottlenecks appear when typical IT solutions attempt to support more than several thousand devices.

Given such network spaces, a management system must be very resistant to failure so that service attributes, such as response time, uptime, and throughput, are delivered in accordance with guarantees in a service level agreement. In addition, a service provider may attempt to support as many customers as possible within a single network management system. The service provider's profit margins may materialize from the ability to bill the usage of a common network management system to multiple customers.

On the other hand, the service provider must be able to support contractual agreements on an individual basis. Service attributes, such as response time, uptime, and throughput, must be determinable for each customer. In order to do so, a network management system must provide a suite of network management tools that is able to perform device monitoring and discovery for each customer's network while integrating these abilities across a shared network backbone to gather the network management information into the service provider's distributed data processing system. By providing network management for each customer within an integrated system, a robust management system can enable a service provider to enter into quality-of-service (QOS) agreements with customers.

Hence, there is a direct relationship between the ability of a management system to provide network monitoring and discovery functionality and the ability of a service provider using the management system to serve multiple customers using a single management system. Preferably, the management system can replicate services, detect faults within a service, restart services, and reassign work to a replicated service. By implementing a common set of interfaces across all of their services, each service developer gains the benefits of system robustness. A well-designed, component-oriented, highly distributed system can easily accept a variety of services on a common infrastructure with built-in fault-tolerance and levels of service.

Distributed data processing systems with thousands of nodes are known in the prior art. The nodes can be geographically dispersed, and the overall computing environment can be managed in a distributed manner. The managed environment can be logically separated into a series of loosely connected managed regions, each with its management server for managing local resources. The management servers coordinate activities across the enterprise and permit remote site management and operation. Local resources within one region can be exported for the use of other regions.

A service provider's management system should have an infrastructure that can accurately measure and report the level of consumption of resources at any given resource throughout the system, which can be quite difficult to accomplish in a large, highly distributed computing environment. In order to fulfill quality-of-service guarantees within a network management system consisting of a million devices or more, performance measurements may be required along various network routes throughout the system. Computational resources throughout the system should be controllable so that the management system can obtain accurate resource consumption measurements along particular routes.

Moreover, if a service provider were able to restrict the consumption of resources from a technical perspective, then the service provider could restrict resource consumption of resources for broader business purposes. The service provider could contract with customers to provide a high level of service, thereby requiring the service provider to limit consumption of resources by customers who have not purchased a high level of service.

In order to either restrict or allocate bandwidth intelligently, a service provider must accumulate metrics relating a consumer of bandwidth and a description of the operations performed by the consumer that led to the bandwidth consumption. In some cases, an enterprise leases an entire communication link for a period of time, such as an entire fiber optic channel at specific time period; with a dedicated network, an enterprise can determine for itself how it has consumed network-related resources. In most other cases, though, a communication link is shared, and the service provider needs to know not only which customer has consumed bandwidth but must have an accurate report of the actual bandwidth consumed so as to determine whether it is meeting quality-of-service guarantees for its customers.

In prior art metrics for determining consumption of bandwidth resources, the focus has generally been at a hardware or firmware level in which bandwidth can be measured at a specific time at a specific node or device either at a specific data rate, such as bits per second, or at a specific packet size, such as bits per packet. The type of metrics that a service provider is able to acquire generally leads the service provider to base its sales model on those metrics. Hence, a service provider might charge consumers for a guaranteed data rate or a flat fee for a certain amount of data. In the prior art, though, the service provider's accumulated metrics are tied to the underlying physical structure. The service provider might be able to report that a certain amount of data passed through a specific network node, device, or port over a specific period, but the service provider cannot tell what application originated or consumed the bandwidth. The service provider might report such statistics to its customers, but the customers would be responsible for cross-referencing the report with its own records to determine why the bandwidth was consumed in the manner that was reported. In other words, the service provider cannot determine and control bandwidth at the application level.

In addition, the prior art does not allow service providers to determine and control bandwidth above the application level at the user level. Currently, some service providers, such as Internet service providers, provide service directly to users. In general, though, these types of service providers are closer to the previously mentioned network-pipe providers; there is a one-to-one correspondence between a user that is receiving service and a network connection to the service provider's facilities. When a single user is connected, the service provider can monitor and control the network connection to determine the amount and characteristics of the data flow to the user. However, if the user configures a private local area network with multiple devices and users using the single network connection to the service provider, such as a home owner with multiple devices connected to a home hub/router, the service provider only observes an increase in data traffic but cannot distinguish data traffic to or from the different devices, cannot control other application-related operations on the devices, and cannot distinguish actions related to various users of those devices.

In order to maintain quality-of-service guarantees, the service provider requires detailed bandwidth data. Moreover, if the service provider desires to be able to offer and charge for services at much finer granularities than raw bandwidth over certain periods of time, then the service provider must be able to control user-level and application-level operations.

Therefore, it would be advantageous to provide a method and system that measures consumption of bandwidth at the application-level and user-level. It would be particularly advantageous if the management system within a service provider's network could identify bandwidth consumption at fine granularities, thereby requiring finer bandwidth usage statistics, such as bits-per-user, packets-per-user, bits-per-application, or packets per application.

SUMMARY OF THE INVENTION

A method, system, apparatus, and computer program product is presented for management of a distributed data processing system. The network management framework is able to monitor multiple sources of network packets on various subnets within the distributed data processing system; distributed packet snoopers are deployed from a packet usage manager to monitor the multiple sources of network packets. Packet filtering parameters can be disseminated to the distributed packet snoopers, and after matching packet filtering parameters against transmitted packets, packet usage events can be returned to the packet usage manager. The system administrator can request packet filtering based upon selected active users or active applications. A bandwidth history database is compiled from bandwidth usage data associated with multiple entities within the data processing system, including users, applications, and/or endpoints within the data processing system. In response to a requested action within the data processing system, bandwidth usage for the requested action can be predicted with reference to the bandwidth history database. The actual and predicted bandwidth usage of requested actions can be displayed to the system administrator in real time. An application can acquire data about its current bandwidth usage requirements and historical bandwidth usage and about the current bandwidth usage requirements and historical bandwidth usage of other applications in order to change its bandwidth consumption behavior.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 7B shows some simplified pseudo-code declarations for an object-oriented manner in which action objects and packet usage snooping can be implemented;

FIG. 11A is a flowchart depicting the manner in which actual bandwidth consumption can be monitored in accordance with a preferred embodiment of the present invention;

FIG. 11B is a flowchart depicting the manner in which bandwidth usage can be predicted in accordance with a preferred embodiment of the present invention.

DETAILED DESCRIPTION OF THE INVENTION

The present invention provides a methodology for managing a distributed data processing system. The manner in which the system management is performed is described further below in more detail after the description of the preferred embodiment of the distributed computing environment in which the present invention operates.

Figure 1:
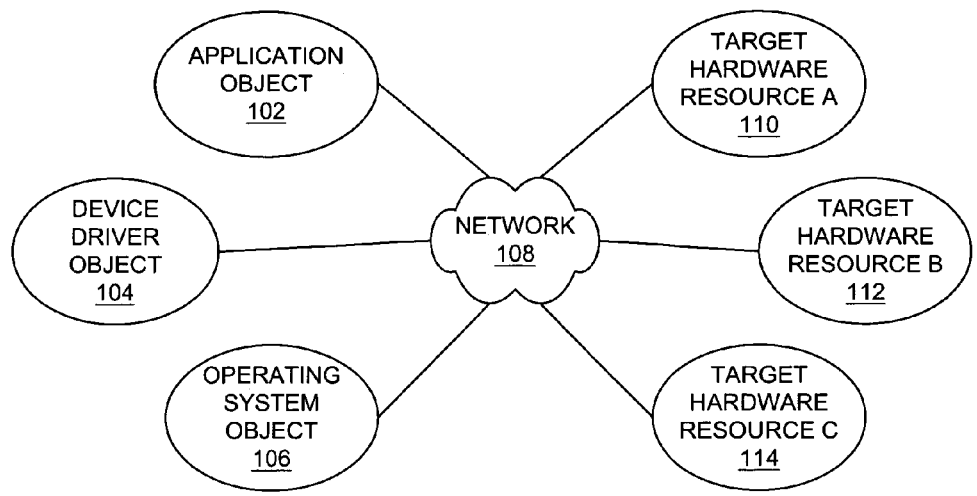
FIG. 1 is a diagram depicting a known logical configuration of software and hardware resources.

With reference now to FIG. 1, a diagram depicts a known logical configuration of software and hardware resources. In this example, the software is organized in an object-oriented system. Application object 102, device driver object 104, and operating system object 106 communicate across network 108 with other objects and with hardware resources 110-114.

In general, the objects require some type of processing, input/output, or storage capability from the hardware resources. The objects may execute on the same device to which the hardware resource is connected, or the objects may be physically dispersed throughout a distributed computing environment. The objects request access to the hardware resource in a variety of manners, e.g., operating system calls to device drivers. Hardware resources are generally available on a first-come, first-serve basis in conjunction with some type of arbitration scheme to ensure that the requests for resources are fairly handled. In some cases, priority may be given to certain requesters, but in most implementations, all requests are eventually processed.

Figure 2A:
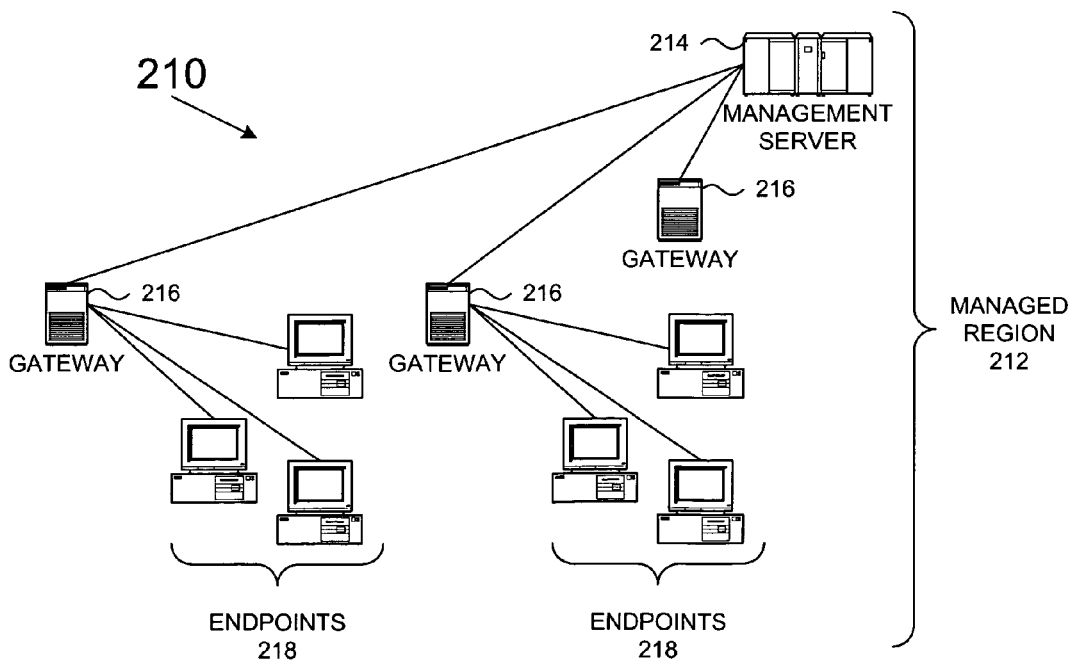
FIG. 2A is simplified diagram illustrating a large distributed computing enterprise environment in which the present invention is implemented.

With reference now to FIG. 2A, the present invention is preferably implemented in a large distributed computer environment 210 comprising up to thousands of "nodes". The nodes will typically be geographically dispersed and the overall environment is "managed" in a distributed manner. Preferably, the managed environment is logically broken down into a series of loosely connected managed regions (MRs) 212, each with its own management server 214 for managing local resources with the managed region. The network typically will include other servers (not shown) for carrying out other distributed network functions. These include name servers, security servers, file servers, thread servers, time servers and the like. Multiple servers 214 coordinate activities across the enterprise and permit remote management and operation. Each server 214 serves a number of gateway machines 216, each of which in turn support a plurality of endpoints/terminal nodes 218. The server 214 coordinates all activity within the managed region using a terminal node manager at server 214.

Figure 2B:
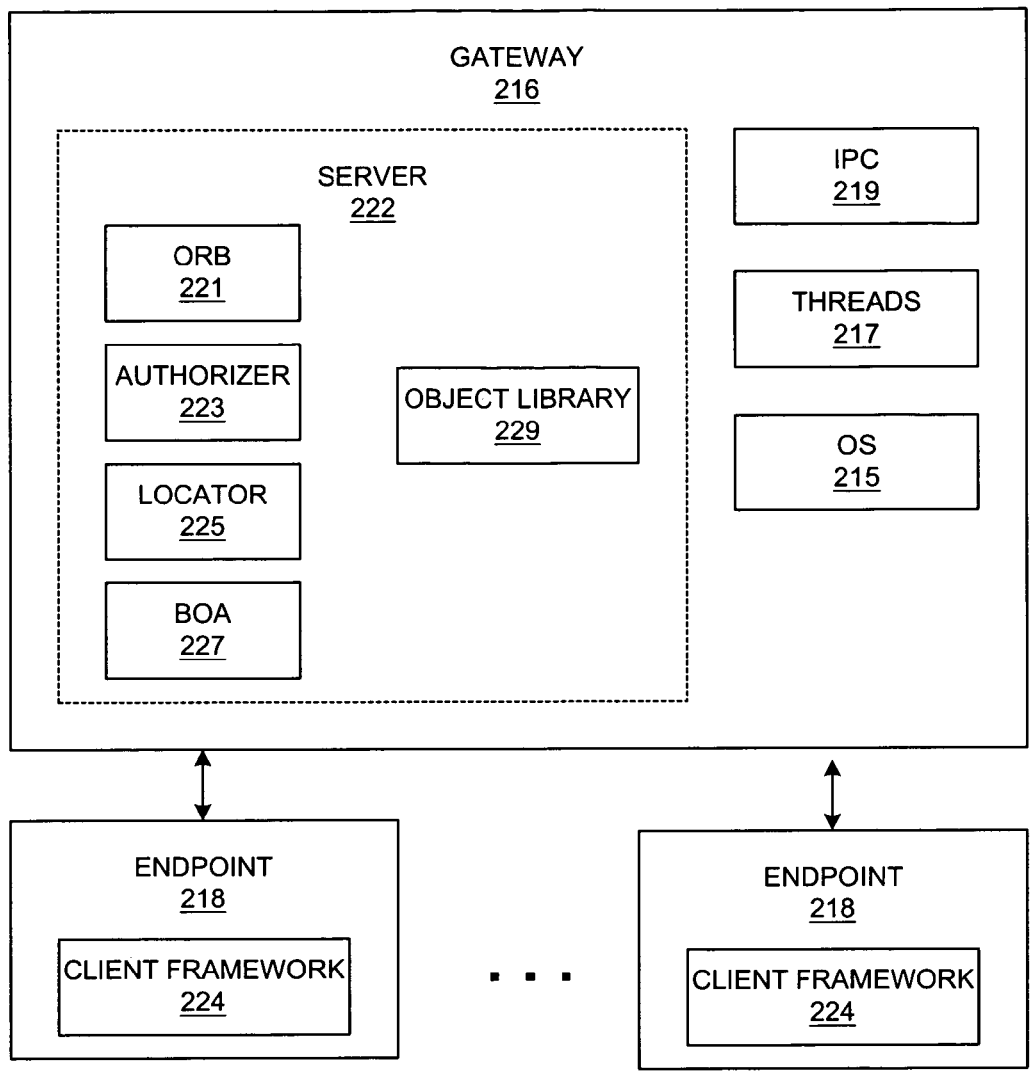
FIG. 2B is a block diagram of a preferred system management framework illustrating how the framework functionality is distributed across the gateway and its endpoints within a managed region.

With reference now to FIG. 2B, each gateway machine 216 runs a server component 222 of a system management framework. The server component 222 is a multi-threaded runtime process that comprises several components: an object request broker (ORB) 221, an authorization service 223, object location service 225 and basic object adapter (BOA) 227. Server component 222 also includes an object library 229. Preferably, ORB 221 runs continuously, separate from the operating system, and it communicates with both server and client processes through separate stubs and skeletons via an inter-process communication (IPC) facility 219. In particular, a secure remote procedure call (RPC) is used to invoke operations on remote objects. Gateway machine 216 also includes operating system 215 and thread mechanism 217.

The system management framework, also termed distributed kernel services (DKS), includes a client component 224 supported on each of the endpoint machines 218. The client component 224 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. It should be noted, however, that an endpoint may also have an ORB for remote object-oriented operations within the distributed environment, as explained in more detail further below.

Using an object-oriented approach, the system management framework facilitates execution of system management tasks required to manage the resources in the managed region. Such tasks are quite varied and include, without limitation, file and data distribution, network usage monitoring, user management, printer or other resource configuration management, and the like. In a preferred implementation, the object-oriented framework includes a Java runtime environment for well-known advantages, such as platform independence and standardized interfaces. Both gateways and endpoints operate portions of the system management tasks through cooperation between the client and server portions of the distributed kernel services.

In a large enterprise, such as the system that is illustrated in FIG. 2A, there is preferably one server per managed region with some number of gateways. For a workgroup-size installation, e.g., a local area network, a single server-class machine may be used as both a server and a gateway. References herein to a distinct server and one or more gateway(s) should thus not be taken by way of limitation as these elements may be combined into a single platform. For intermediate size installations, the managed region grows breadthwise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoints and gateways, and this mapping is preferably dynamic.

As noted above, there are one or more gateways per managed region. Preferably, a gateway is a fully managed node that has been configured to operate as a gateway. In certain circumstances, though, a gateway may be regarded as an endpoint. A gateway always has a network interface card (NIC), so a gateway is also always an endpoint. A gateway usually uses itself as the first seed during a discovery process. Initially, a gateway does not have any information about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2C:
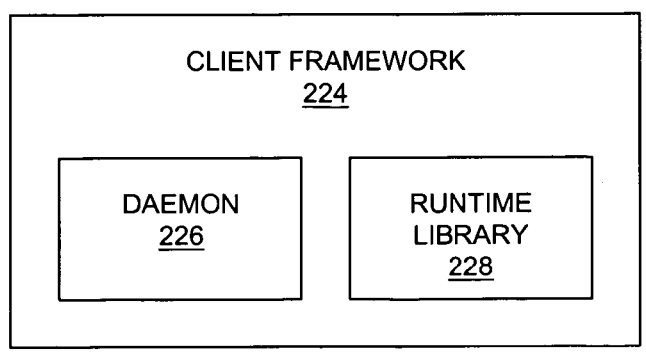
FIG. 2C is a block diagram of the elements that comprise the low cost framework (LCF) client component of the system management framework.

As also discussed above, the endpoint is a machine running the system management framework client component, which is referred to herein as a management agent. The management agent has two main parts as illustrated in FIG. 2C: daemon 226 and application runtime library 228. Daemon 226 is responsible for endpoint login and for spawning application endpoint executables. Once an executable is spawned, daemon 226 has no further interaction with it. Each executable is linked with application runtime library 228, which handles all further communication with the gateway.

Preferably, the server and each of the gateways is a distinct computer. For example, each computer may be an IBM eServer™ xSeries™ running the LINUX® operating system. Of course, other machines and/or operating systems may be used as well for the gateway and server machines.

Each endpoint is also a computing device. In one preferred embodiment of the invention, most of the endpoints are personal computers, e.g., desktop machines or laptops. In this architecture, the endpoints need not be high powered or complex machines or workstations. An endpoint computer preferably includes a Web browser such as Netscape Navigator or Microsoft Internet Explorer. An endpoint computer thus may be connected to a gateway via the Internet, an intranet or some other computer network.

Preferably, the client-class framework running on each endpoint is a low-maintenance, low-cost framework that is ready to do management tasks but consumes few machine resources because it is normally in an idle state. Each endpoint may be "dataless" in the sense that system management data is not stored therein before or after a particular system management task is implemented or carried out.

Figure 2D:
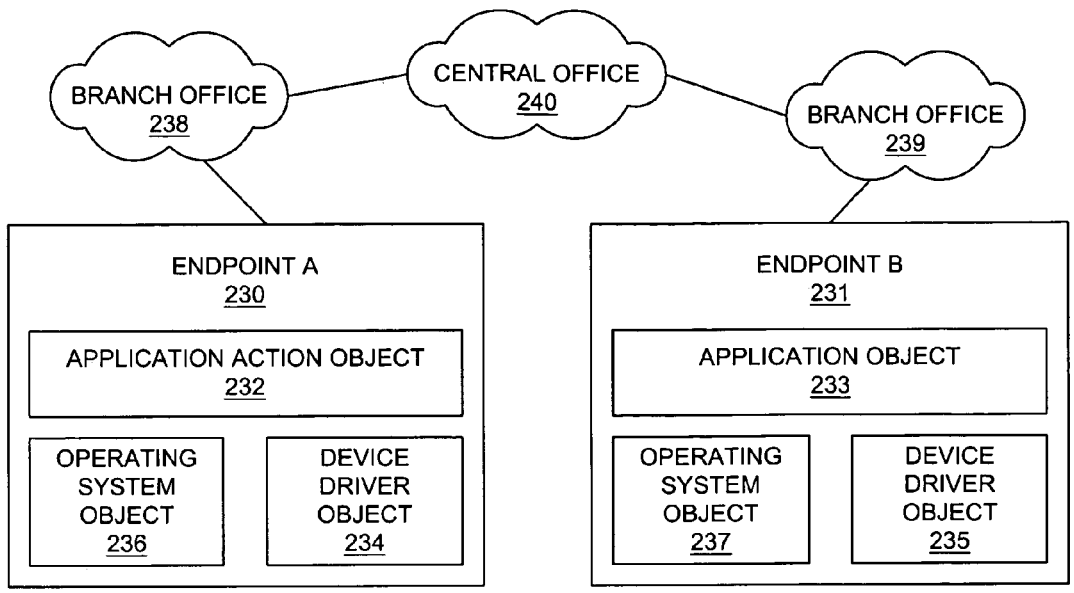
FIG. 2D is a diagram depicting a logical configuration of software objects residing within a hardware network similar to that shown in FIG. 2A.

With reference now to FIG. 2D, a diagram depicts a logical configuration of software objects residing within a hardware network similar to that shown in FIG. 2A. The endpoints in FIG. 2D are similar to the endpoints shown in FIG. 2B. Object-oriented software, similar to the collection of objects shown in FIG. 1, executes on the endpoints. Endpoints 230 and 231 support application action object 232 and application object 233, device driver objects 234-235, and operating system objects 236-237 that communicate across a network with other objects and hardware resources.

Resources can be grouped together by an enterprise into managed regions representing meaningful groups. Overlaid on these regions are domains that divide resources into groups of resources that are managed by gateways. The gateway machines provide access to the resources and also perform routine operations on the resources, such as polling. FIG. 2D shows that endpoints and objects can be grouped into managed regions that represent branch offices 238 and 239 of an enterprise, and certain resources are controlled by in central office 240. Neither a branch office nor a central office is necessarily restricted to a single physical location, but each represents some of the hardware resources of the distributed application framework, such as routers, system management servers, endpoints, gateways, and critical applications, such as corporate management Web servers. Different types of gateways can allow access to different types of resources, although a single gateway can serve as a portal to resources of different types.

Figure 2E:
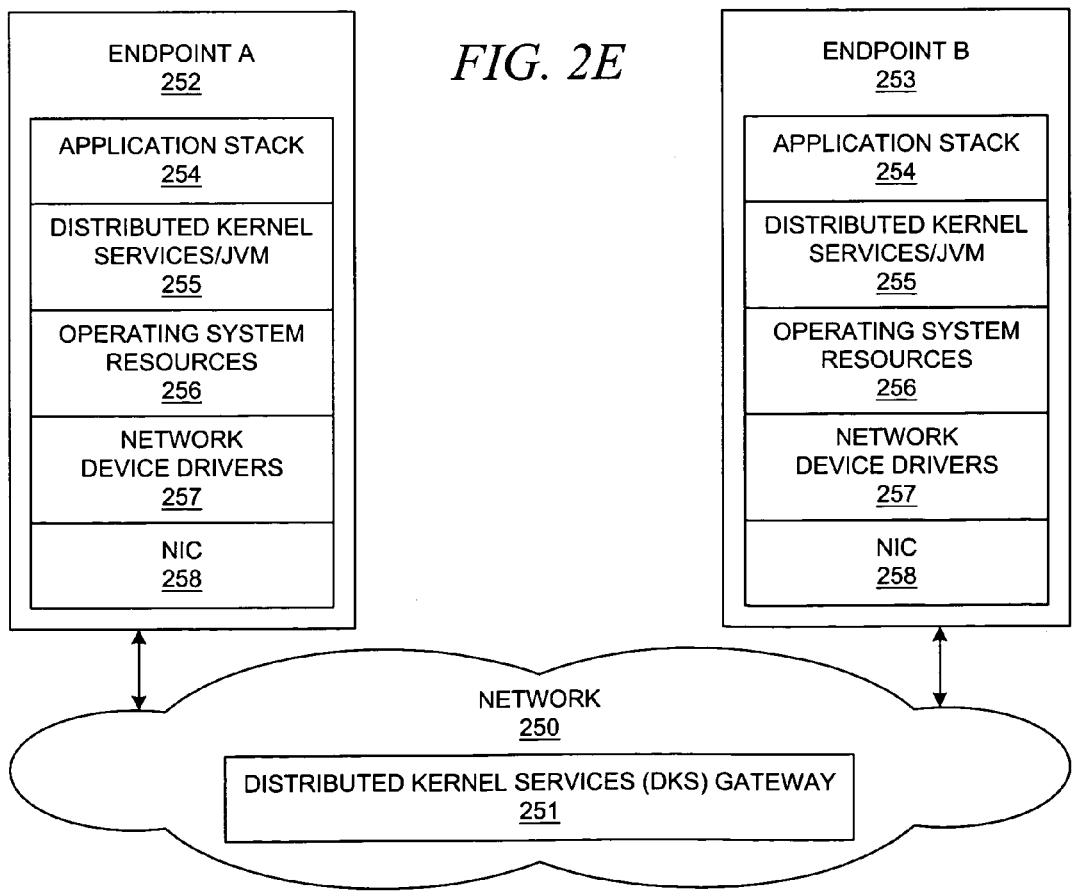
FIG. 2E is a diagram depicting the logical relationships between components within a system management framework that includes two endpoints and a gateway.

With reference now to FIG. 2E, a diagram depicts the logical relationships between components within a system management framework that includes two endpoints and a gateway. FIG. 2E shows more detail of the relationship between components at an endpoint. Network 250 includes gateway 251 and endpoints 252 and 253, which contain similar components, as indicated by the similar reference numerals used in the figure. An endpoint may support a set of applications 254 that use services provided by the distributed kernel services 255, which may rely upon a set of platform-specific operating system resources 256. Operating system resources may include TCP/IP-type resources, SNMP-type resources, and other types of resources. For example, a subset of TCP/IP-type resources may be a line printer (LPR) resource that allows an endpoint to receive print jobs from other endpoints. Applications 254 may also provide self-defined sets of resources that are accessible to other endpoints. Network device drivers 257 send and receive data through NIC hardware 258 to support communication at the endpoint.

Figure 2F:
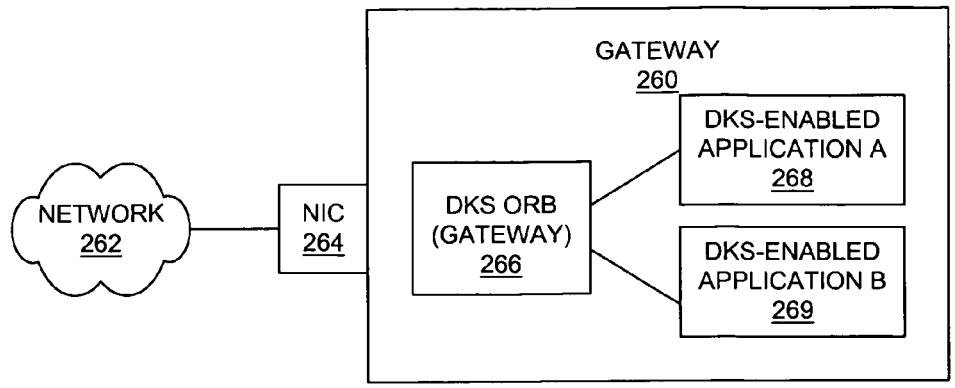
FIG. 2F is a diagram depicting the logical relationships between components within a system management framework that includes a gateway supporting two DKS-enabled applications.

With reference now to FIG. 2F, a diagram depicts the logical relationships between components within a system management framework that includes a gateway supporting two DKS-enabled applications. Gateway 260 communicates with network 262 through NIC 264. Gateway 260 contains ORB 266 that supports DKS-enabled applications 268 and 269. FIG. 2F shows that a gateway can also support applications. In other words, a gateway should not be viewed as merely being a management platform but may also execute other types of applications.

Figure 2G:
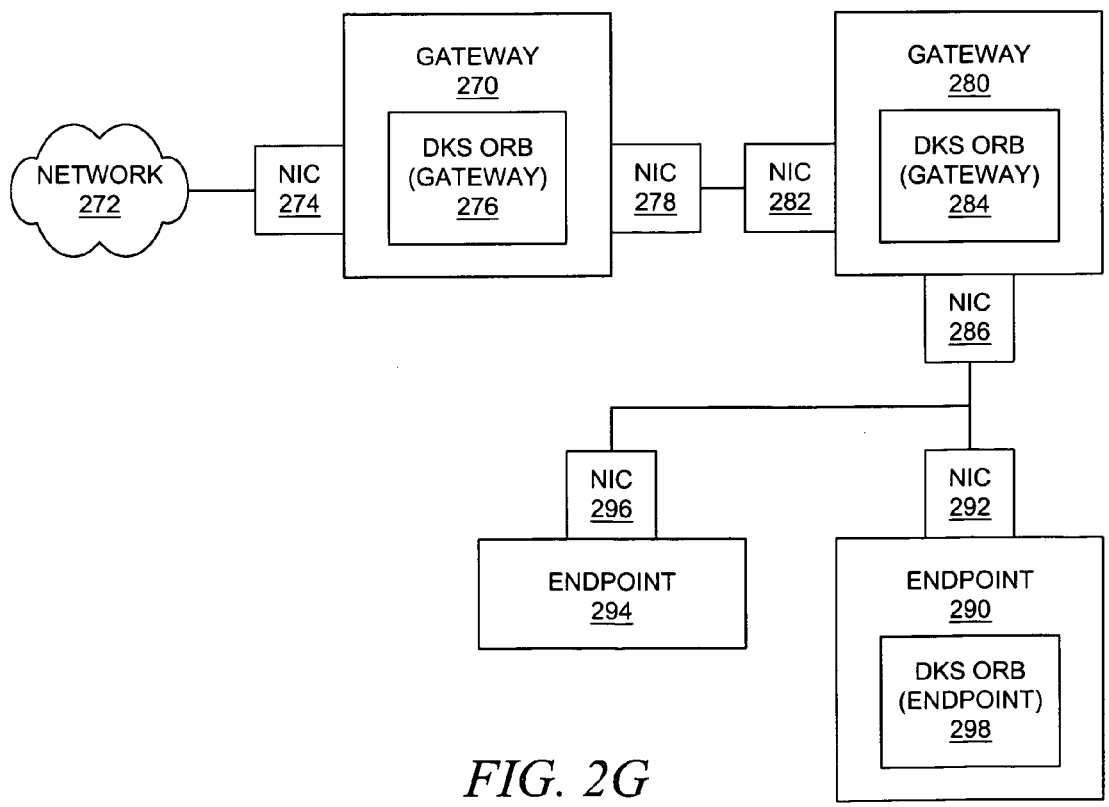
FIG. 2G is a diagram depicting the logical relationships between components within a system management framework that includes two gateways supporting two endpoints.

With reference now to FIG. 2G, a diagram depicts the logical relationships between components within a system management framework that includes two gateways supporting two endpoints. Gateway 270 communicates with network 272 through NIC 274. Gateway 270 contains ORB 276 that may provide a variety of services, as is explained in more detail further below. In this particular example, FIG. 2G shows that a gateway does not necessarily connect with individual endpoints.

Gateway 270 communicates through NIC 278 and network 279 with gateway 280 and its NIC 282. Gateway 280 contains ORB 284 for supporting a set of services. Gateway 280 communicates through NIC 286 and network 287 to endpoint 290 through its NIC 292 and to endpoint 294 through its NIC 296. Endpoint 290 contains ORB 298 while endpoint 294 does not contain an ORB. In this particular example, FIG. 2G also shows that an endpoint does not necessarily contain an ORB. Hence, any use of endpoint 294 as a resource is performed solely through management processes at gateway 280.

FIGS. 2F and 2G also depict the importance of gateways in determining routes/data paths within a highly distributed system for addressing resources within the system and for performing the actual routing of requests for resources. The importance of representing NICs as objects for an object-oriented routing system is described in more detail further below.

As noted previously, the present invention is directed to a methodology for managing a distributed computing environment. A resource is a portion of a computer system's physical units, a portion of a computer system's logical units, or a portion of the computer system's functionality that is identifiable or addressable in some manner to other physical or logical units within the system.

Figure 3:
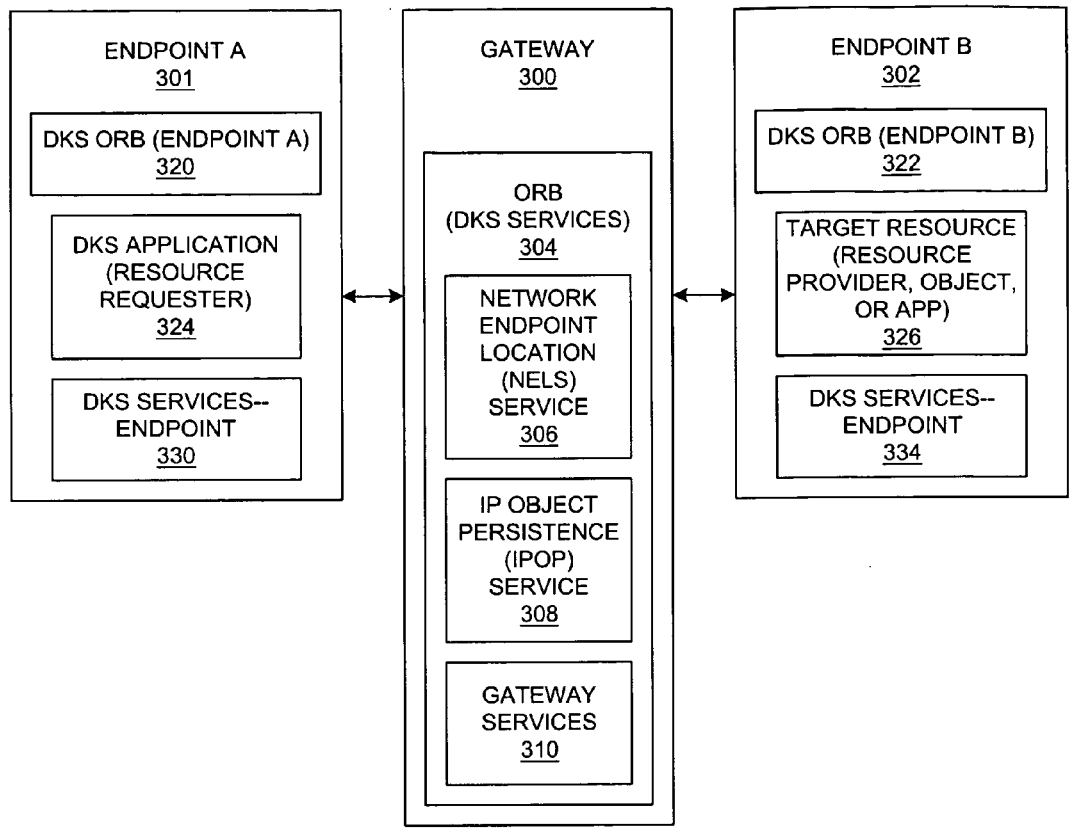
FIG. 3 is a block diagram depicting components within the system management framework that provide resource leasing management functionality within a distributed computing environment such as that shown in FIGS. 2D-2E.

With reference now to FIG. 3, a block diagram depicts components within the system management framework within a distributed computing environment such as that shown in FIGS. 2D-2E. A network contains gateway 300 and endpoints 301 and 302. Gateway 302 runs ORB 304. In general, an ORB can support different services that are configured and run in conjunction with an ORB. In this case, distributed kernel services (DKS) include Network Endpoint Location Service (NEL) 306, IP Object Persistence (IPOP) service 308, and Gateway Service 310.

The Gateway Service processes action objects, which are explained in more detail below, and directly communicates with endpoints or agents to perform management operations. The gateway receives events from resources and passes the events to interested parties within the distributed system. The NEL service works in combination with action objects and determines which gateway to use to reach a particular resource. A gateway is determined by using the discovery service of the appropriate topology driver, and the gateway location may change due to load balancing or failure of primary gateways.

Other resource level services may include an SNMP (Simple Network Management Protocol) service that provides protocol stacks, polling service, and trap receiver and filtering functions. The SNMP Service can be used directly by certain components and applications when higher performance is required or the location independence provided by the gateways and action objects is not desired. A Metadata Service can also be provided to distribute information concerning the structure of SNMP agents.

The representation of resources within DKS allows for the dynamic management and use of those resources by applications. DKS does not impose any particular representation, but it does provide an object-oriented structure for applications to model resources. The use of object technology allows models to present a unified appearance to management applications and hide the differences among the underlying physical or logical resources. Logical and physical resources can be modeled as separate objects and related to each other using relationship attributes.

By using objects, for example, a system may implement an abstract concept of a router and then use this abstraction within a range of different router hardware. The common portions can be placed into an abstract router class while modeling the important differences in subclasses, including representing a complex system with multiple objects. With an abstracted and encapsulated function, the management applications do not have to handle many details for each managed resource. A router usually has many critical parts, including a routing subsystem, memory buffers, control components, interfaces, and multiple layers of communication protocols. Using multiple objects has the burden of creating multiple object identifiers (OIDs) because each object instance has its own OID. However, a first order object can represent the entire resource and contain references to all of the constituent parts.

Each endpoint may support an object request broker, such as ORBs 320 and 322, for assisting in remote object-oriented operations within the DKS environment. Endpoint 301 contains DKS-enabled application 324 that utilizes object-oriented resources found within the distributed computing environment. Endpoint 302 contains target resource provider object or application 326 that services the requests from DKS-enabled application 324. A set of DKS services 330 and 334 support each particular endpoint.

Applications require some type of insulation from the specifics of the operations of gateways. In the DKS environment, applications create action objects that encapsulate command which are sent to gateways, and the applications wait for the return of the action object. Action objects contain all of the information necessary to run a command on a resource. The application does not need to know the specific protocol that is used to communicate with the resource. The application is unaware of the location of the resource because it issues an action object into the system, and the action object itself locates and moves to the correct gateway. The location independence allows the NEL service to balance the load between gateways independently of the applications and also allows the gateways to handle resources or endpoints that move or need to be serviced by another gateway.

The communication between a gateway and an action object is asynchronous, and the action objects provide error handling and recovery. If one gateway goes down or becomes overloaded, another gateway is located for executing the action object, and communication is established again with the application from the new gateway. Once the controlling gateway of the selected endpoint has been identified, the action object will transport itself there for further processing of the command or data contained in the action object. If it is within the same ORB, it is a direct transport. If it is within another ORB, then the transport can be accomplished with a "Moveto" command or as a parameter on a method call.

Queuing the action object on the gateway results in a controlled process for the sending and receiving of data from the IP devices. As a general rule, the queued action objects are executed in the order that they arrive at the gateway. The action object may create child action objects if the collection of endpoints contains more than a single ORB ID or gateway ID. The parent action object is responsible for coordinating the completion status of any of its children. The creation of child action objects is transparent to the calling application. A gateway processes incoming action objects, assigns a priority, and performs additional security challenges to prevent rogue action object attacks. The action object is delivered to the gateway that must convert the information in the action object to a form suitable for the agent. The gateway manages multiple concurrent action objects targeted at one or more agents, returning the results of the operation to the calling managed object as appropriate.

In the preferred embodiment, potentially leasable target resources are Internet protocol (IP) commands, e.g., pings, and Simple Network Management Protocol (SNMP) commands that can be executed against endpoints in a managed region. Referring again to FIGS. 2F and 2G, each NIC at a gateway or an endpoint may be used to address an action object. Each NIC is represented as an object within the IPOP database, which is described in more detail further below.

The Action Object IP (AOIP) Class is a subclass of the Action Object Class. AOIP objects are the primary vehicle that establishes a connection between an application and a designated IP endpoint using a gateway or stand-alone service. In addition, the Action Object SNMP (AOSnmp) Class is also a subclass of the Action Object Class. AOSnmp objects are the primary vehicle that establishes a connection between an application and a designated SNMP endpoint via a gateway or the Gateway Service. However, the present invention is primarily concerned with IP endpoints.

The AOIP class should include the following: a constructor to initialize itself; an interface to the NEL service; a mechanism by which the action object can use the ORB to transport itself to the selected gateway; a mechanism by which to communicate with the SNMP stack in a stand-alone mode; a security check verification of access rights to endpoints; a container for either data or commands to be executed at the gateway; a mechanism by which to pass commands or classes to the appropriate gateway or endpoint for completion; and public methods to facilitate the communication between objects.

The instantiation of an AOIP object creates a logical circuit between an application and the targeted gateway or endpoint. This circuit is persistent until command completion through normal operation or until an exception is thrown. When created, the AOIP object instantiates itself as an object and initializes any internal variables required. An action object IP may be capable of running a command from inception or waiting for a future command. A program that creates an AOIP object must supply the following elements: address of endpoints; function to be performed on the endpoint, class, or object; and data arguments specific to the command to be run. A small part of the action object must contain the return end path for the object. This may identify how to communicate with the action object in case of a breakdown in normal network communications. An action object can contain either a class or object containing program information or data to be delivered eventually to an endpoint or a set of commands to be performed at the appropriate gateway. Action objects IP return back a result for each address endpoint targeted.

Using commands such as "Ping", "Trace Route", "Wake-On LAN", and "Discovery", the AOIP object performs the following services: facilitates the accumulation of metrics for the user connections; assists in the description of the topology of a connection; performs Wake-On LAN tasks using helper functions; and discovers active agents in the network environment.

The NEL service finds a route (data path) to communicate between the application and the appropriate endpoint. The NEL service converts input to protocol, network address, and gateway location for use by action objects. The NEL service is a thin service that supplies information discovered by the IPOP service. The primary roles of the NEL service are as follows: support the requests of applications for routes; maintain the gateway and endpoint caches that keep the route information; ensure the security of the requests; and perform the requests as efficiently as possible to enhance performance.

For example, an application requires a target endpoint (target resource) to be located. The target is ultimately known within the DKS space using traditional network values, i.e. a specific network address and a specific protocol identifier. An action object is generated on behalf of an application to resolve the network location of an endpoint. The action object asks the NEL service to resolve the network address and define the route to the endpoint in that network.

One of the following is passed to the action object to specify a destination endpoint: an EndpointAddress object; a fully decoded NetworkAddress object; and a string representing the IP address of the IP endpoint. In combination with the action objects, the NEL service determines which gateway to use to reach a particular resource. The appropriate gateway is determined using the discovery service of the appropriate topology driver and may change due to load balancing or failure of primary gateways. An "EndpointAddress" object must consist of a collection of at least one or more unique managed resource IDs. A managed resource ID decouples the protocol selection process from the application and allows the NEL service to have the flexibility to decide the best protocol to reach an endpoint. On return from the NEL service, an "AddressEndpoint" object is returned, which contains enough information to target the best place to communicate with the selected IP endpoints. It should be noted that the address may include protocol-dependent addresses as well as protocol-independent addresses, such as the virtual private network id and the IPOP Object ID. These additional addresses handle the case where duplicate addresses exist in the managed region.

When an action needs to be taken on a set of endpoints, the NEL service determines which endpoints are managed by which gateways. When the appropriate gateway is identified, a single copy of the action object is distributed to each identified gateway. The results from the endpoints are asynchronously merged back to the caller application through the appropriate gateways. Performing the actions asynchronously allows for tracking all results whether the endpoints are connected or disconnected. If the action object IP fails to execute an action object on the target gateway, NEL is consulted to identify an alternative path for the command. If an alternate path is found, the action object IP is transported to that gateway and executed. It may be assumed that the entire set of commands within one action object IP must fail before this recovery procedure is invoked.

Figure 4:
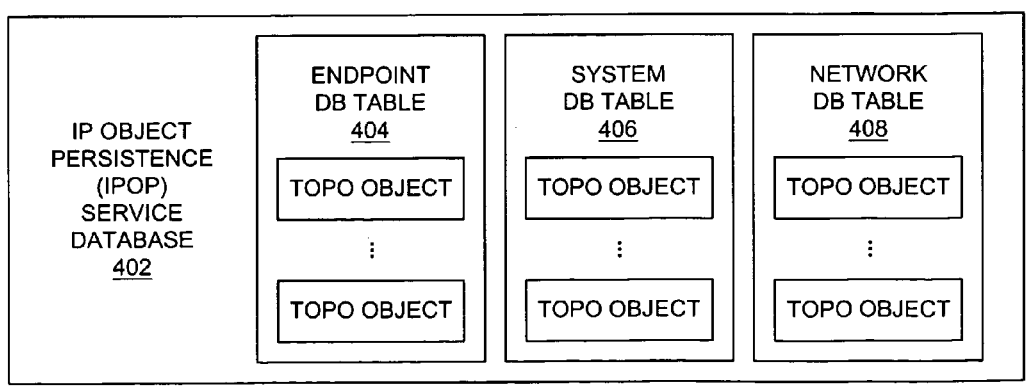
FIG. 4 is a block diagram showing data stored by a the IPOP (IP Object Persistence) service.

With reference now to FIG. 4, a block diagram shows the manner in which data is stored by the IPOP (IP Object Persistence) service. IPOP service database 402 contains endpoint database table 404, system database table 406, and network database table 408. Each table contains a set of topological (topo) objects for facilitating the reservation of resources at IP endpoints and the execution of action objects. Information within IPOP service database 402 allows applications to generate action objects for resources previously identified as IP objects through a discovery process across the distributed computing environment. FIG. 4 merely shows that the topo objects may be separated into a variety of categories that facilitate processing on the various objects. The separation of physical network categories facilitates the efficient querying and storage of these objects while maintaining the physical network relationships in order to produce a graphical user interface of the network topology.

Figure 5A:
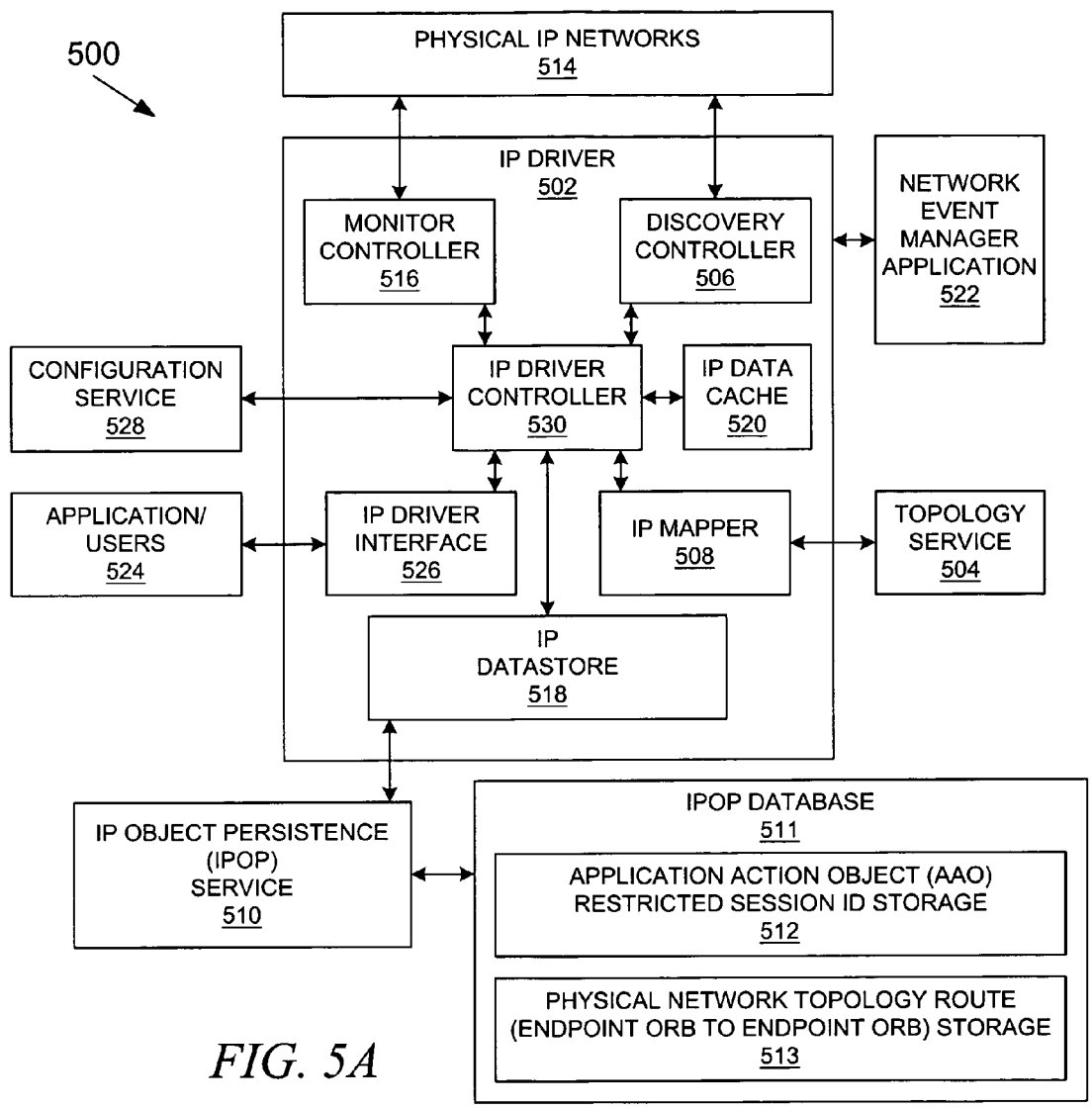
FIG. 5A is a block diagram showing the IPOP service in more detail.

With reference now to FIG. 5A, a block diagram shows the IPOP service in more detail. In the preferred embodiment of the present invention, an IP driver subsystem is implemented as a collection of software components for discovering, i.e. detecting, IP "objects", i.e. IP networks, IP systems, and IP endpoints by using physical network connections. This discovered physical network is used to create topology data that is then provided through other services via topology maps accessible through a graphical user interface (GUI) or for the manipulation of other applications. The IP driver system can also monitor objects for changes in IP topology and update databases with the new topology information. The IPOP service provides services for other applications to access the IP object database.

IP driver subsystem 500 contains a conglomeration of components, including one or more IP drivers 502. Every IP driver manages its own "scope", which is described in more detail further below, and every IP driver is assigned to a topology manager within Topology Service 504, which can serve may than one IP driver. Topology Service 504 stores topology information obtained from discovery controller 506. The information stored within the Topology Service may include graphs, arcs, and the relationships between nodes determined by IP mapper 508. Users can be provided with a GUI to navigate the topology, which can be stored within a database within the Topology Service.

IPOP service 510 provides a persistent repository 511 for discovered IP objects. Persistent repository 511 also stores application action object restricted session identifiers 512 and physical network topology route 513, as discussed in more detail below with respect to FIGS. 6A-6E. Discovery controller 506 detects IP objects in Physical IP networks 514, and monitor controller 516 monitors IP objects. A persistent repository, such as IPOP database 511, is updated to contain information about the discovered and monitored IP objects. IP driver may use temporary IP data store component 518 and IP data cache component 520 as necessary for caching IP objects or storing IP objects in persistent repository 511, respectively. As discovery controller 506 and monitor controller 516 perform detection and monitoring functions, events can be written to network event manager application 522 to alert network administrators of certain occurrences within the network, such as the discovery of duplicate IP addresses or invalid network masks.

External applications/users 524 can be other users, such as network administrators at management consoles, or applications that use IP driver GUI interface 526 to configure IP driver 502, manage/unmanage IP objects, and manipulate objects in persistent repository 512. Configuration service 528 provides configuration information to IP driver 502. IP driver controller 532 serves as central control of all other IP driver components.

Referring back to FIG. 2G, a network discovery engine is a distributed collection of IP drivers that are used to ensure that operations on IP objects by gateways 260, 270, and 280 can scale to a large installation and provide fault-tolerant operation with dynamic start/stop or reconfiguration of each IP driver. The IPOP Service manages discovered IP objects; to do so, the IPOP Service uses a distributed database in order to efficiently service query requests by a gateway to determine routing, identity, or a variety of details about an endpoint. The IPOP Service also services queries by the Topology Service in order to display a physical network or map them to a logical network, which is a subset of a physical network that is defined programmatically or by an administrator. IPOP fault tolerance is also achieved by distribution of IPOP data and the IPOP Service among many Endpoint ORBs.

The IP Monitor Controller uses SNMP polls to determine if there have been any configuration changes in an IP system. It also looks for any IP endpoints added to or deleted from an IP system. The IP Monitor Controller also monitors the statuses of IP endpoints in an IP system. In order to reduce network traffic, an IP driver will use SNMP to get the status of all IP endpoints in an IP system in one query unless an SNMP agent is not running on the IP system. Otherwise, an IP driver will use "Ping" instead of SNMP. An IP driver will use "Ping" to get the status of an IP endpoint if it is the only IP endpoint in the system since the response from "Ping" is quicker than SNMP.

One or more IP drivers can be deployed to provide distribution of IP discovery and promote scalability of IP driver subsystem services in large networks where a single IP driver subsystem is not sufficient to discover and monitor all IP objects. Each IP discovery driver performs discovery and monitoring on a collection of IP resources within the driver's "scope". A driver's scope, which is explained in more detail below, is simply the set of IP subnets for which the driver is responsible for discovering and monitoring. Network administrators generally partition their networks into as many scopes as needed to provide distributed discovery and satisfactory performance.

A potential risk exists if the scope of one driver overlaps the scope of another, i.e. if two drivers attempt to discover/monitor the same device. Accurately defining unique and independent scopes may require the development of a scope configuration tool to verify the uniqueness of scope definitions. Routers also pose a potential problem in that while the networks serviced by the routers will be in different scopes, a convention needs to be established to specify to which network the router "belongs", thereby limiting the router itself to the scope of a single driver.

Some ISPs may have to manage private networks whose addresses may not be unique across the installation, like 10.0.0.0 network. In order to manage private networks properly, first, the IP driver has to be installed inside the internal networks in order to be able to discover and manage the networks. Second, since the discovered IP addresses may not be unique in across an entire installation that consists of multiple regions, multiple customers, etc., a private network ID has to be assigned to the private network addresses. In the preferred embodiment, the unique name of a subnet becomes "privateNetworkId\subnetAddress". Those customers that do not have duplicate networks address can just ignore the private network ID; the default private network ID is 0.

If Network Address Translator (NAT) is installed to translate the internal IP addresses to Internet IP addresses, users can install the IP drivers outside of NAT and manage the IP addresses inside the NAT. In this case, an IP driver will see only the translated IP addresses and discover only the IP addresses translated. If not all IP addresses inside the NAT are translated, an IP driver will not able to discover all of them. However, if IP drivers are installed this way, users do not have to configure the private network ID.

Scope configuration is important to the proper operation of the IP drivers because IP drivers assume that there are no overlaps in the drivers' scopes. Since there should be no overlaps, every IP driver has complete control over the objects within its scope. A particular IP driver does not need to know anything about the other IP drivers because there is no synchronization of information between IP drivers. The Configuration Service provides the services to allow the DKS components to store and retrieve configuration information for a variety of other services from anywhere in the networks. In particular, the scope configuration will be stored in the Configuration Services so that IP drivers and other applications can access the information.

The ranges of addresses that a driver will discover and monitor are determined by associating a subnet address with a subnet mask and associating the resulting range of addresses with a subnet priority. An IP driver is a collection of such ranges of addresses, and the subnet priority is used to help decide the system address. A system can belong to two or more subnets, such as is commonly seen with a Gateway. The system address is the address of one of the NICs that is used to make SNMP queries. A user interface can be provided, such as an administrator console, to write scope information into the Configuration Service. System administrators do not need to provide this information at all, however, as the IP drivers can use default values.

An IP driver gets its scope configuration information from the Configuration Service, which may be stored using the following format:
scopeID=driverID,anchorname,subnetAddress:subnetMask
[:privateNetworkId:privateNetworkName:subnetPriority][, subnetAddress:subnetMask:privateNetworkId:privateNetworkN ame:subnetPriority]]

Typically, one IP driver manages only one scope. Hence, the "scopeID" and "driverID" would be the same. However, the configuration can provide for more than one scope managed by the same driver. "Anchorname" is the name in the name space in which the Topology Service will put the IP networks objects.

A scope does not have to include an actual subnet configured in the network. Instead, users/administrators can group subnets into a single, logical scope by applying a bigger subnet mask to the network address. For example, if a system has subnet "147.0.0.0" with mask of "255.255.0.0" and subnet "147.1.0.0" with a subnet mask of "255.255.0.0", the subnets can be grouped into a single scope by applying a mask of "255.254.0.0". Assume that the following table is the scope of IP Driver 2. The scope configuration for IP Driver 2 from the Configuration Service would be:
2=2,ip,147.0.0.0:255.254.0.0,146.100.0.0:255.255.0.0, 69.0.0.0:255.0.0.0.

| Subnet address | Subnet mask |
|---|---|
| 147.0.0.0 | 255.255.0.0 |
| 147.1.0.0 | 255.255.0.0 |
| 146.100.0.0 | 255.255.0.0 |
| 69.0.0.0 | 255.0.0.0 |

In general, an IP system is associated with a single IP address, and the "scoping" process is a straightforward association of a driver's ID with the system's IP address.

Routers and multi-homed systems, however, complicate the discovery and monitoring process because these devices may contain interfaces that are associated with different subnets. If all subnets of routers and multi-homed systems are in the scope of the same driver, the IP driver will manage the whole system. However, if the subnets of routers and multi-homed systems are across the scopes of different drivers, a convention is needed to determine a dominant interface: the IP driver that manages the dominant interface will manage the router object so that the router is not being detected and monitored by multiple drivers; each interface is still managed by the IP driver determined by its scope; the IP address of the dominant interface will be assigned as the system address of the router or multi-homed system; and the smallest (lowest) IP address of any interface on the router will determine which driver includes the router object within its scope.

Users can customize the configuration by using the subnet priority in the scope configuration. The subnet priority will be used to determinate the dominant interface before using the lowest IP address. If the subnet priorities are the same, the lowest IP address is then used. Since the default subnet priority would be "0", then the lowest IP address would be used by default.

Figure 5B:
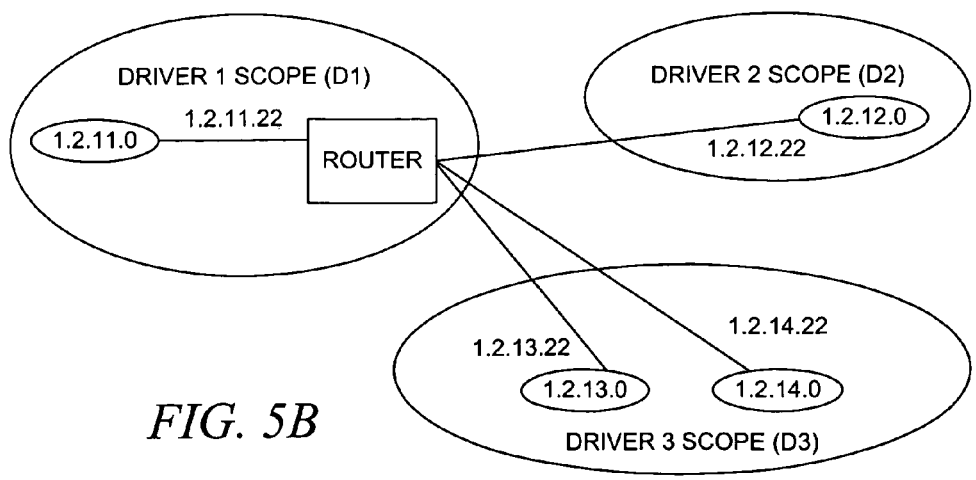
FIG. 5B is a network diagram depicting a set of routers that undergo a scoping process.

With reference now to FIG. 5B, a network diagram depicts a network with a router that undergoes a scoping process. IP driver D1 will include the router in its scope because the subnet associated with that router interface is lower than the other three subnet addresses. However, each driver will still manage those interfaces inside the router in its scope. Drivers D2 and D3 will monitor the devices within their respective subnets, but only driver D1 will store information about the router itself in the IPOP database and the Topology Service database.

If driver D1's entire subnet is removed from the router, driver D2 will become the new "owner" of the router object because the subnet address associated with driver D2 is now the lowest address on the router. Because there is no synchronization of information between the drivers, the drivers will self-correct over time as they periodically rediscover their resources. When the old driver discovers that it no longer owns the router, it deletes the router's information from the databases. When the new driver discovers the router's lowest subnet address is now within its scope, the new driver takes ownership of the router and updates the various data bases with the router's information. If the new driver discovers the change before the old driver has deleted the object, then the router object may be briefly represented twice until the old owner deletes the original representation.

There are two kinds of associations between IP objects. One is "IP endpoint in IP system" and the other is "IP endpoint in IP network". The implementation of associations relies on the fact that an IP endpoint has the object IDs (OIDs) of the IP system and the IP network in which it is located. Based on the scopes, an IP driver can partition all IP networks, IP Systems, and IP endpoints into different scopes. A network and all its IP endpoints will always be assigned in the same scope. However, a router may be assigned to an IP Driver, but some of its interfaces are assigned to different to different IP drivers. The IP drivers that do not manage the router but manage some of its interfaces will have to create interfaces but not the router object. Since those IP drivers do not have a router object ID to assign to its managed interfaces, they will assign a unique system name instead of object ID in the IP endpoint object to provide a link to the system object in a different driver. Because of the inter-scope association, when the IP Persistence Service (IPOP) is queried to find all the IP endpoints in system, it will have to search not only IP endpoints with the system ID but also IP endpoints with its system name. If a distributed IP Persistence Service is implemented, the IP Persistence Service has to provide extra information for searching among IP Persistence Services.

As noted above, in the DKS environment, an application requests the creation of an action object that encapsulates a command that is sent to a gateway, and the application waits for the return of the action object's completion. Action objects generally contain all of the information necessary to run a command on a resource. The application does not necessarily need to know the specific protocol that is used to communicate with the resource. Moreover, the application may be unaware of the location of the resource because it issues an action object into the system, and the action object itself locates and moves to the correct gateway.

For example, an application requires a target resource (target endpoint) to be located. The target object is ultimately known within the DKS space using traditional network values, i.e. a specific network address and a specific protocol identifier. However, an application can address a target object with an Object ID. An action object is generated on behalf of an application to resolve the network location of an endpoint. The action object asks the NEL service to resolve the network address and define the route to the endpoint in that network. One benefit of location independence is that the NEL service can balance the load between gateways independently of the applications and also allows the gateways to handle resources or endpoints that move or need to be serviced by another gateway.

In order to fulfill quality-of-service guarantees within a network management system, which might consist of a million devices or more, a service provider may require the elimination or the control of performance bottlenecks at specific endpoints or at various network points throughout the system. In particular, the system management framework of the present invention identifies, at the application and/or user level, sources of small packets, which drastically impact the use of network bandwidth. These features are explained in more detail below after explaining the use of application action objects with respect to FIGS. 6A-6E.

Figure 6A:
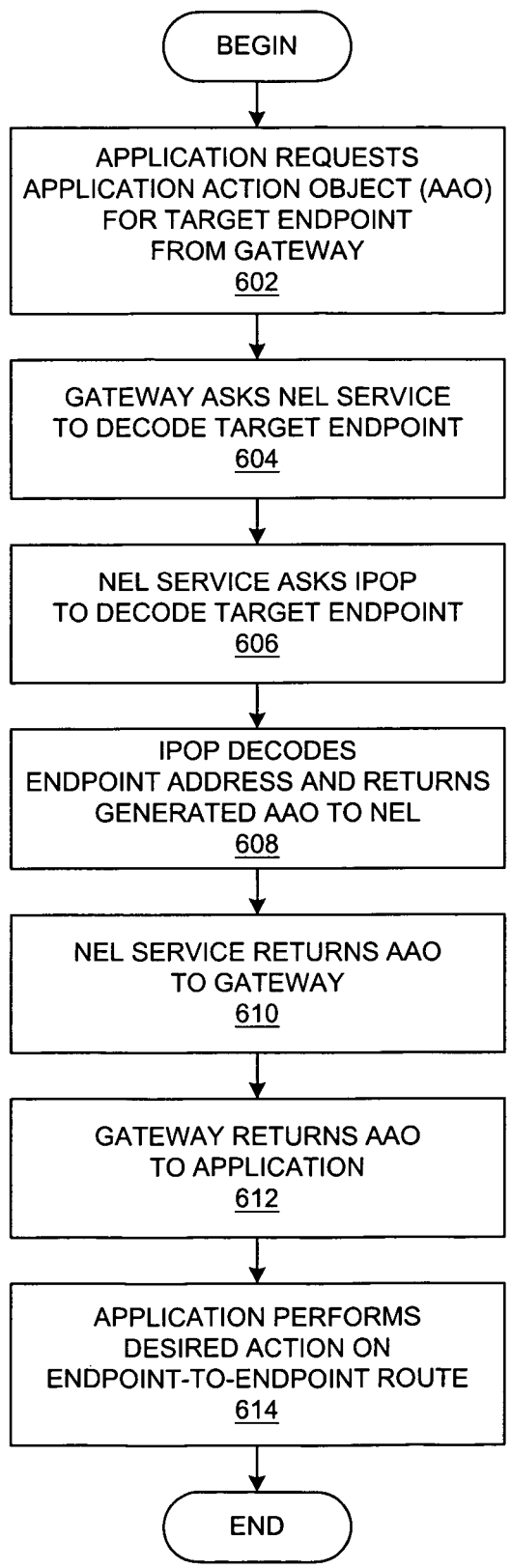
FIG. 6A is a flowchart depicting a process for obtaining and using an application action object (AAO) within the network management system of the present invention.

With respect to FIG. 6A, a flowchart depicts a process for obtaining and using an application action object (AAC) within the network management system of the present invention. An application action object is a class of objects that extends an action object class in a manner that is appropriate for a particular application. The process begins when an application requests an application action object for a target endpoint from the Gateway service (step 602).

It should be noted that the process shown in FIG. 6A is generic with respect to an application requesting and obtaining action objects. However, given the processing context shown in FIGS. 6B-6E, it may be assumed that the requested AAO in step 602 is a special type of AAO that requires that the network management system execute the AAO with a high level of performance, in which case the network management system applies access restrictions to endpoints along the route that will be used by the AAO.

The network management system described above provides a methodology through which a network management framework can restrict access to endpoints along logical routes through a network. The initiation of restricted access begins with a request for a special type of AAO that requires restricted access for its proper implementation or proper execution. Depending upon the system implementation, there may be several types of action objects for which DKS will automatically initiate the reservation of a restricted route.

For example, one special type of application action object would be an action that executes a performance measurement; in general, an accurate performance measurement requires that endpoints along a network route not be used by other action objects while the action object for the performance measurement is being processed or executed. Hence, if a particular request for an instance of an action object is defined as a type of action object related to performance measurements, then the processes shown in FIGS. 6B-6E may be engaged.

Referring again to FIG. 6A, the process continues when the Gateway Service asks the NEL service to decode the target endpoint from the request (step 604). As noted previously, one of the primary roles of the NEL service is to support the requests from applications for routes, as explained above with respect to FIG. 3. The NEL service then asks the IPOP service to decode the endpoint object (step 606). Assuming that the processing has been successfully accomplished, IPOP returns an appropriate AAO to the NEL service (step 608), and the NEL service returns the AAO to the Gateway service (step 610). The Gateway service then returns the AAO to the application (step 612). The application then performs the desired action (step 614), such as a performance measurement for an endpoint-to-endpoint route, and the process is complete. As is apparent with respect to FIG. 6A, an application action object that may require special route restrictions can be processed by an application in a manner similar to that used to process any other type of application action object.

Figure 6B:
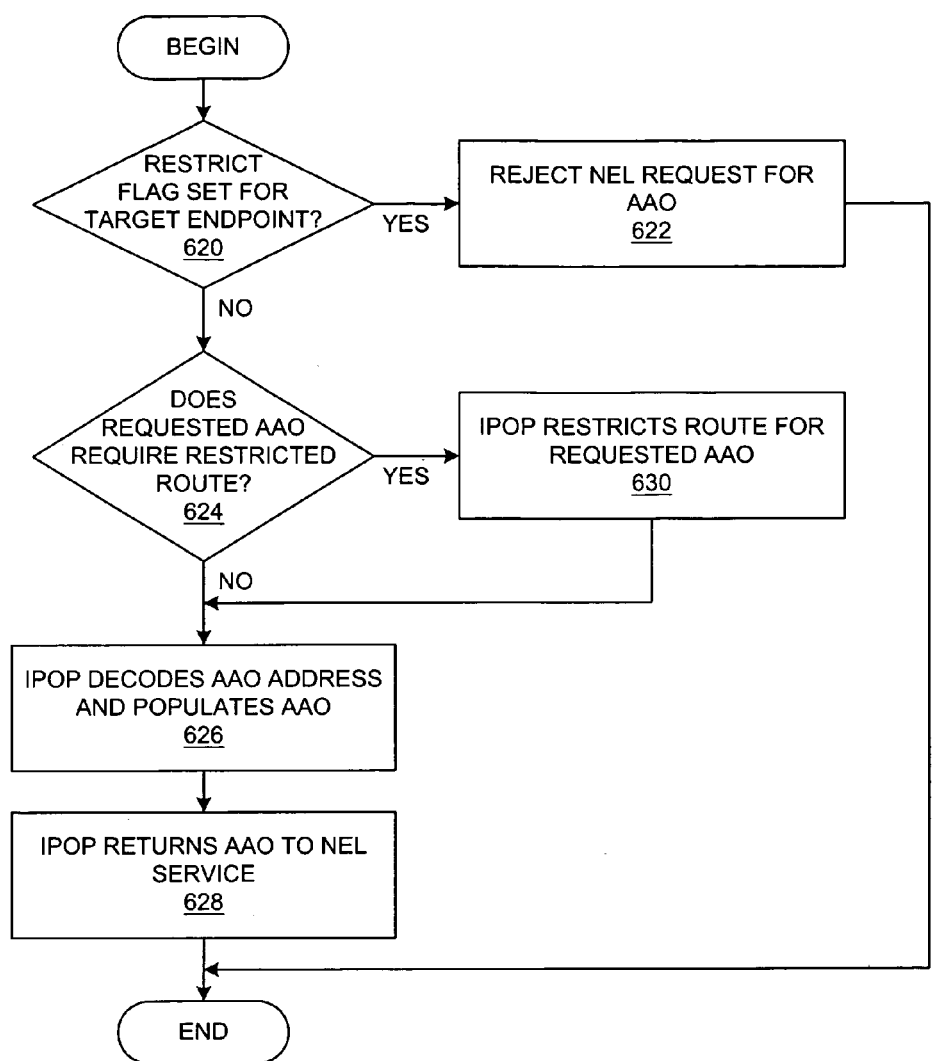
FIG. 6B is a flowchart depicting a process for generating an AAO with consideration of whether the requested AAO is directed to a restricted AAO, i.e. an AAO that requires restricted access to endpoints along a route.

With respect to FIG. 6B, a flowchart depicts a process for generating an AAO with consideration of whether the requested AAO is directed to a restricted AAO, i.e. an AAO that requires restricted access to endpoints along a route. FIG. 6B provides more detail for step 608 shown in FIG. 6A. The process begins with IPOP receiving the target endpoint from the NEL service and determining whether another application has already requested that access to or use of the target endpoint should be restricted, which may be indicated by setting a restrict flag to "true" (step 620). If so, then the request for the AAO is rejected (step 622), and the process is complete. In this case, the target endpoint has an associated indication that it is already being used exclusively by another application.

If the restrict flag is not set for the target endpoint, then a determination is made as to whether the requested AAO is a type of AAO that requires a restricted route for its proper completion or execution (step 624). In other words, if the requested AAO were to be granted, then the AAO should be processed or executed at a high level of service, performance, or priority. If not, then IPOP has determined that it is clear to process the request. IPOP decodes the AAO address from the IPOPOid and populates the AAO with the required information (step 626). IPOP then returns the AAO to the NEL service (step 628), and the process is complete.

If a restricted route is required for the proper completion or execution of the action object, then IPOP restricts the route for the requested AAO (step 630), and completes the creation of the AAO at steps 626-628, and the process is complete. As noted above, IPOP may examine the type of requested AAO in order to determine whether or not execution of the AAO would require a high level of performance such that a restricted route should be reserved for the application action object's execution. As noted above with respect to FIG. 3, the instantiation of an action object creates a logical circuit between a source endpoint and a target endpoint; various endpoints along a route through a network are used by the network management framework to complete the execution of an action object. The management framework described above may be viewed as a methodology for reserving the logical circuit; the logical circuit is reserved if the type of requested action object requires a reserved logical circuit or if, for other reasons, the network management system should complete or should attempt to complete the requested action object with a high level of service or performance. The network management system may have other reasons for using a reserved route of endpoints, such as a customer guarantee in which a service provider has contracted to provide a particular quality of service.

It should also be noted that IPOP may determine within the processing of step 630 that a particular endpoint within the computed route for the requested AAO may already have been granted restricted access. Hence, IPOP would be required to select a new route for the requested AAO that does not contain the restricted endpoint before IPOP could restrict an entire route. Otherwise, the request for the AAO may still be denied if an entire route for the requested AAO cannot be secured because all possible routes for the requested AAO contain at least one endpoint that has already been reserved with restricted access.

Figure 6D:
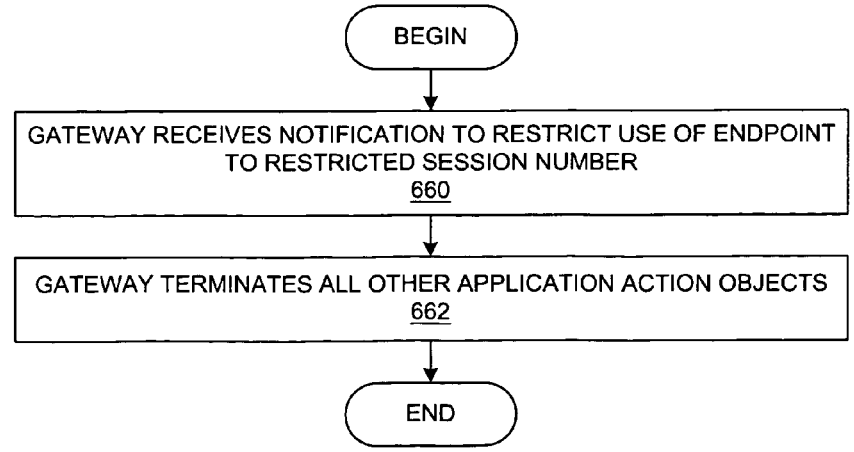
FIG. 6D is a flowchart depicting a process within a gateway for restricting further usage of an endpoint to which access restrictions are being applied.
Figure 6C:
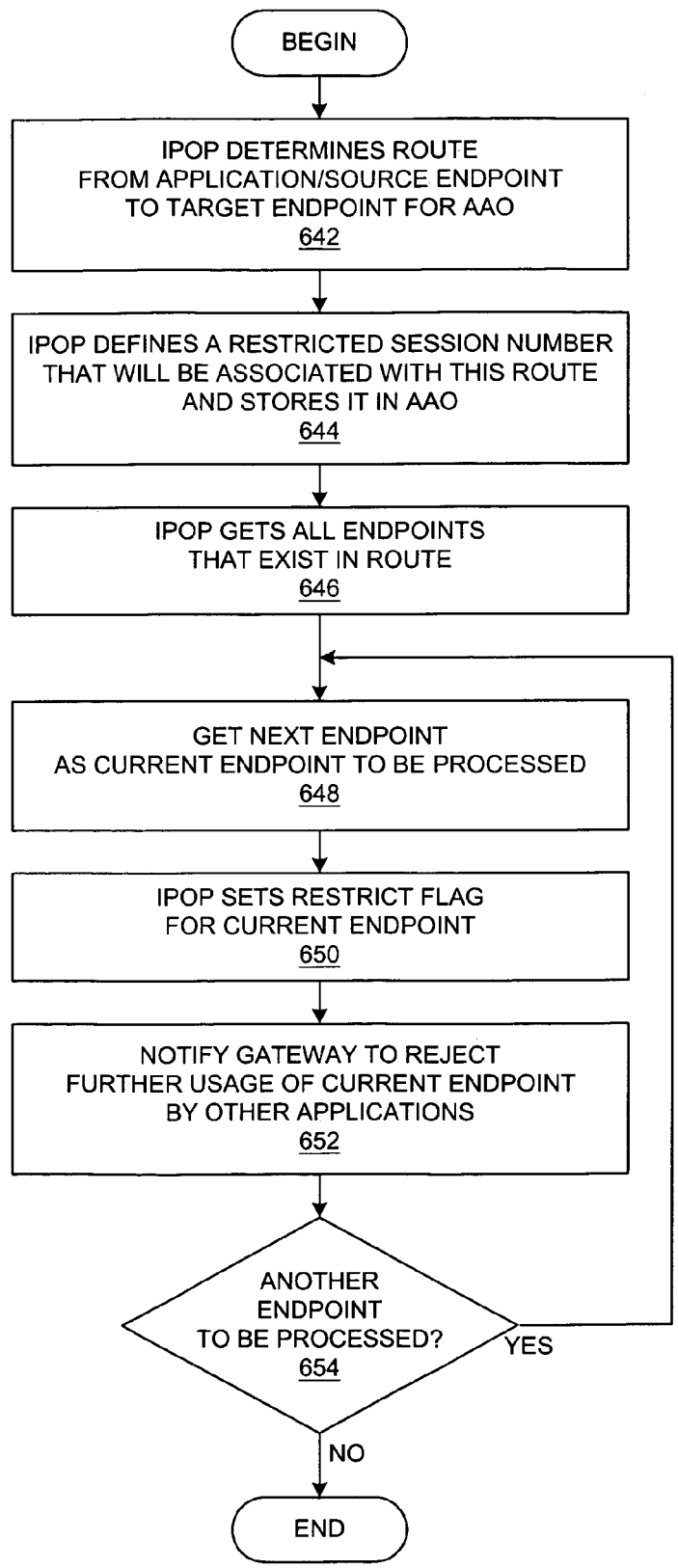
FIG. 6C is a flowchart depicting a process for associating an indication of restricted access for endpoints along a route.

With respect to FIG. 6C, a flowchart depicts a process for associating an indication of restricted access for endpoints along a route. FIG. 6C provides more detail for step 630 shown in FIG. 6B. The process begins with IPOP determining a logical route through the distributed system along a series of endpoints from the application endpoint or source endpoint to the target endpoint as required to execute the requested AAO (step 642). IPOP then defines a restricted session number that will be associated with this route and stores it in the AAO (step 644), and IPOP gets the set of all endpoints for the route (step 646).

A next endpoint from the set of endpoints in the route is obtained (step 648), and IPOP sets the restrict flag for the endpoint that is currently being processed (step 650). IPOP also notifies the Gateway service to reject further usage of the current endpoint by other applications (step 652). A determination is then made whether there are other endpoints in the set of endpoints for the route (step 654), and if so, then the process branches back to step 648 to process another endpoint. Otherwise, the process of restricting the route is then complete.

With respect to FIG. 6D, a flowchart depicts a process within a gateway for restricting further usage of an endpoint to which access restrictions are being applied. FIG. 6D provides more detail for step 652 shown in FIG. 6C. A gateway receives the notification to restrict use of an endpoint, and the notification includes a restricted session number (step 660). The endpoint in the notification is within the route for the requested AAO, as determined by IPOP, as explained with respect to FIG. 6C, and the gateway that processes the notification is responsible for managing the endpoint. The gateway then terminates all other application action objects that have been using the endpoint for which restricted access has been granted to the other application action object (step 662), and the process is complete.

Figure 6E:
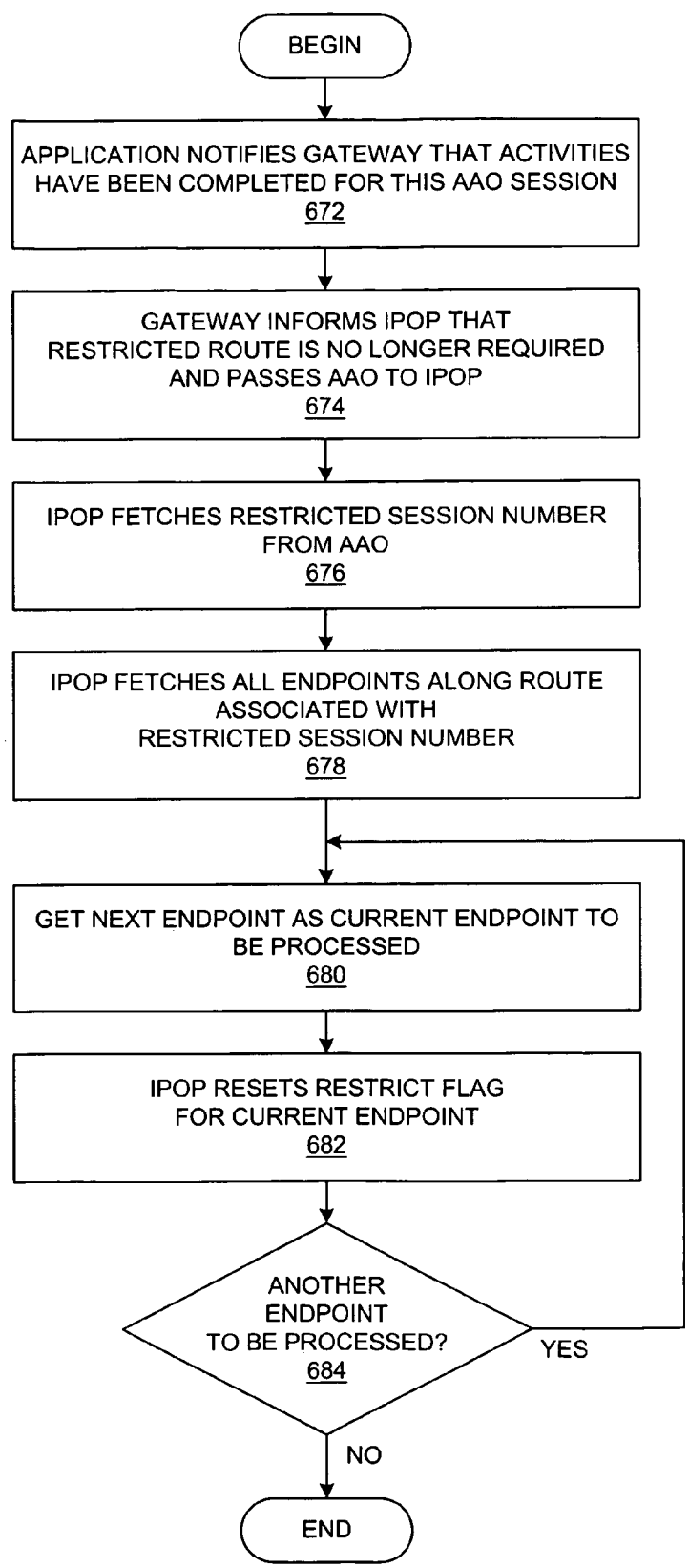
FIG. 6E is a flowchart depicting a process for releasing a previously restricted route of endpoints.

With respect to FIG. 6E, a flowchart depicts a process for releasing a previously restricted route of endpoints. FIG. 6E provides more detail for steps that would occur after an application had used a route that had been restricted using processes shown in FIGS. 6A-6D. The process begins with the application notifying the gateway service that activities have been completed for this particular AAO with its associated restricted session number (step 672). The gateway then informs IPOP that the restricted route is no longer required and passes the AAO to the IPOP service (step 674). IPOP fetches the restricted session number from the AAO (step 676), and IPOP fetches all endpoints along the route that is associated with the restricted session number (step 678).

A next endpoint from the set of endpoints in the route is obtained (step 680), and IPOP resets the restrict flag for the endpoint that is currently being processed (step 682). IPOP also notifies the Gateway service to reject further usage of the current endpoint by other applications, if necessary. A determination is then made whether there are other endpoints in the set of endpoints for the route (step 684), and if so, then the process branches back to step 680 to process another endpoint. Otherwise, the process of releasing the restrictions on the endpoints along the route is then complete.

FIGS. 6A-6E depicts one manner in which application action objects can be used through the management framework described above. More specifically, though, the application framework can identify the sources of packets throughout the management framework. In order to do so, a distributed DKS packet snooper can monitor various aspects of network packet usage for sessions of interest to a system administrator. The methodology for doing so is explained in more detail with respect to the remaining figures.

Figure 7A:
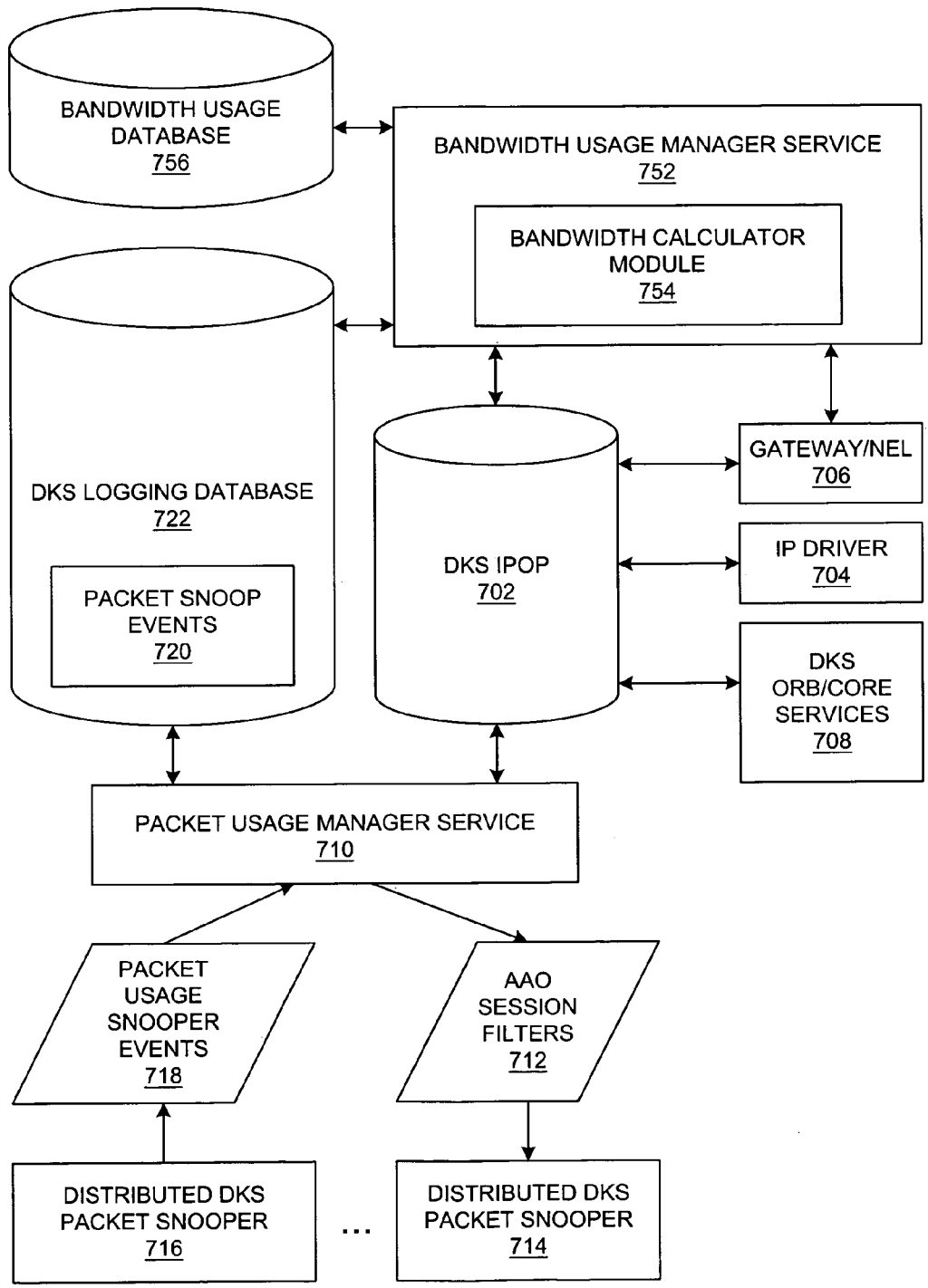
FIG. 7A is a block diagram depicting a set of components that may be used to implement package usage snooping.

With reference now to FIG. 7A, a block diagram depicts a set of components that may be used to implement packet usage snooping. Some of the elements shown in FIG. 7A are also shown in other figures, but FIG. 7A depicts components from the perspective of packet usage snooping. DKS IPOP database 702 contains information about objects discovered by IP driver 704 and about application action objects managed by Gateway Service 706. Other ORB or core services 708 may also access IPOP database 702.

Of particular importance to the present invention is Packet Usage Monitor Service 710, which administrates packet snooping through the DKS management framework by sending AAO session filters 712 to distributed packet snoopers 714 located throughout the application management framework that initiate the snooping of packets. The filter defines parameters for the types and sizes of packets to be snooped, such as all packets associated with particular endpoints or only certain types of packets. In return, distributed packet snoopers 714-716 return packet usage snooper events 718 that contain statistical information about the usage of packets by various categories. As a result, Packet Usage Monitor Service 710 logs events of interest to system administrators as packet snoop events 720 within a more generalized system event logging database 722.

With the Packet Usage Manager Service to provide detailed information on the use of packets throughout the DKS system, Bandwidth Usage Manager Service 752 uses DKS logging database 722 to retrieve packet snoop event information 720 and calculate detailed bandwidth usage statistics using Bandwidth Calculator Module 754 to be stored in bandwidth usage database 756.

By having a mechanism that can snoop packets at the application and user level, the DKS system can then aggregate those statistics over time the Bandwidth Usage Manager Service to determine bandwidth usage that is more comprehensive than the packet level usage statistics. However, the bandwidth usage statistics of the present invention still represent a much finer granularity of information concerning consumers of bandwidth than the metrics provided by the prior art. A more detailed description of the Bandwidth Usage Manager Service is provided below after a description of the manner in which the Packet Usage Manager Service operates.

With reference now to FIG. 7B, some simplified pseudo-code declarations are shown for depicting an object-oriented manner in which action objects and packet usage snooping can be implemented. Different types of snooping sessions can be defined. Packet filter objects can be defined that contain the parameters for a snooping session. More importantly, snooper events can be defined for particular endpoints of interest to a system administrator.

Figure 8A:
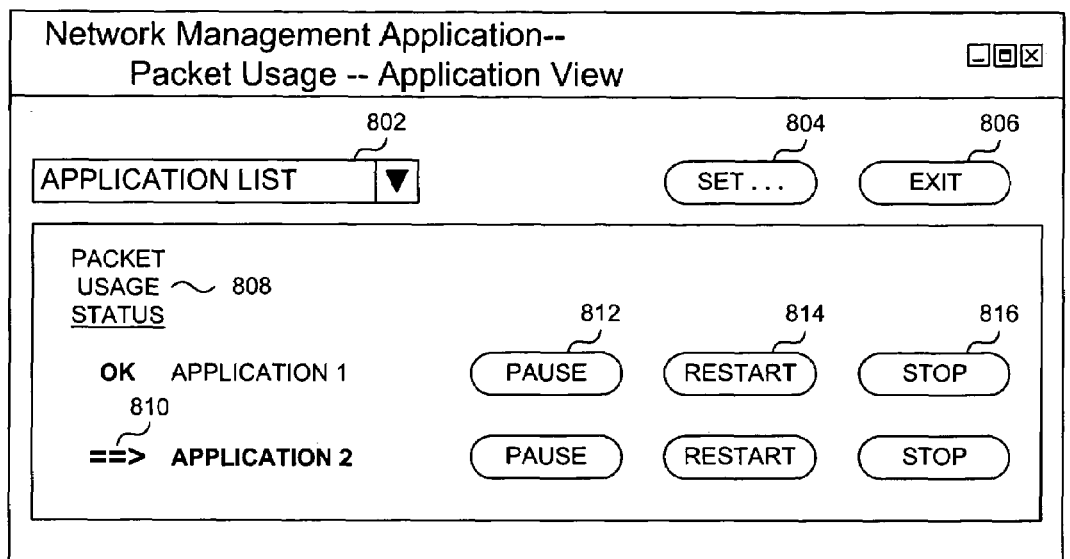
FIGS. 8A-8B are a set of figures depicting a graphical user interface (GUI) that may be used by a network or system administrator to set monitoring parameters for monitoring packet usage.
Figure 8B:
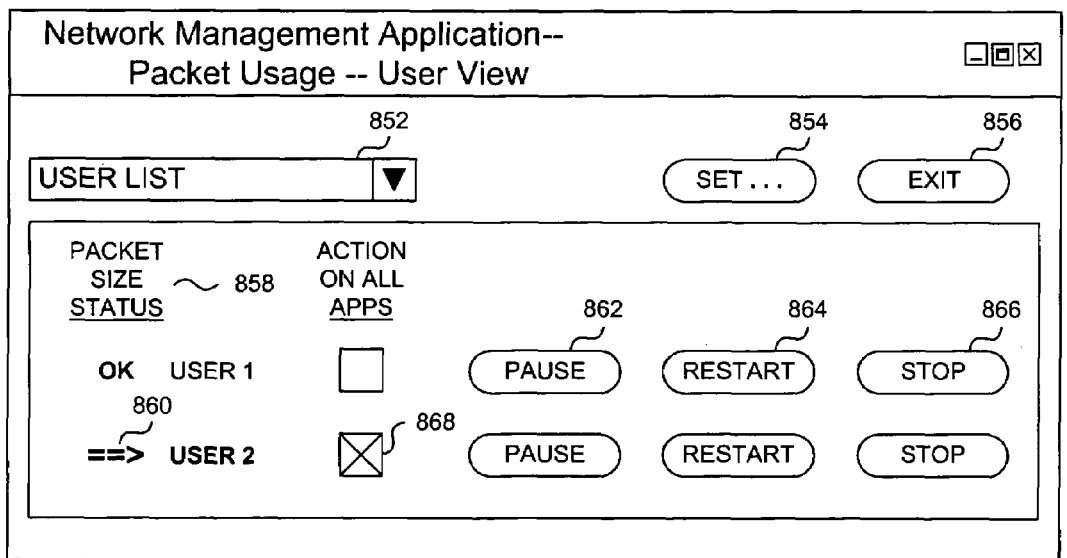

With reference now to FIGS. 8A-8B, a set of figures depict a graphical user interface (GUI) that may be used by a network or system administrator to set monitoring parameters for monitoring packet. Referring to FIG. 8A, network management application window 800 allows a system administrator to select options for monitoring for application-related sources of small packets within the system. Drop-down list 802 allows the administrator to select applications to be monitored, while "SET" button 804 allows the administrator to select parameters to be monitored, such as packet type and size. "EXIT" button 806 allows the administrator to close the window.

After selecting one or more applications to be monitored, the administration application periodically queries the DKS logging database for packet usage events and compares those events with the select snooping parameters chosen by the administrator. Status 808 shows the current packet usage status of each application. In the example, indicator 810 is directing the user's attention to an application that has somehow exceeded or violated its monitoring parameters. The administrator could select the application name to view more information about the events associated with the application, or the user may select "PAUSE" button 812, "RESTART" button 814, or "STOP" button 816 to perform the indicated action on the application so as to control the consumption of resources, i.e. network bandwidth, being used by the application.

Referring to FIG. 8B, network management application window 850 also allows a system administrator to select options for monitoring for user-related sources of small packets within the system; FIG. 8B allows control of user-related sources, whereas FIG. 8A allows control of application-related sources. Hence, the window shown in FIG. 8B is very similar to the window shown in FIG. 8A, but depending on the implementation, could be combined into a single user interface or have different options. Drop-down list 852 allows the administrator to select users to be monitored, while "SET" button 854 allows the administrator to select parameters to be monitored, such as packet type and size. "EXIT" button 856 allows the administrator to close the window.

After selecting one or more users to be monitored, the administration application periodically queries the DKS logging database for packet usage events and compares those events with the select snooping parameters chosen by the administrator. Status 858 shows the current packet usage status of each user. In the example, indicator 860 is directing the system administrator's attention to a user that has somehow exceeded or violated its monitoring parameters. The administrator could select the user name to view more information about the events associated with the user, or the administrator may select "PAUSE" button 862, "RESTART" button 864, or "STOP" button 866 to perform the indicated action on the user's applications so as to control the consumption of resources, i.e. network bandwidth, being used by the user. Checkbox 868 allows the administrator to take action on all of the applications that are currently associated with the user, e.g., all of the applications initiated within the system by the user. Otherwise, selection of one of buttons 862-866 may open a dialog box showing various applications associated with the user and allowing the administrator to select an application on which to perform the selected action.

Figure 9A:
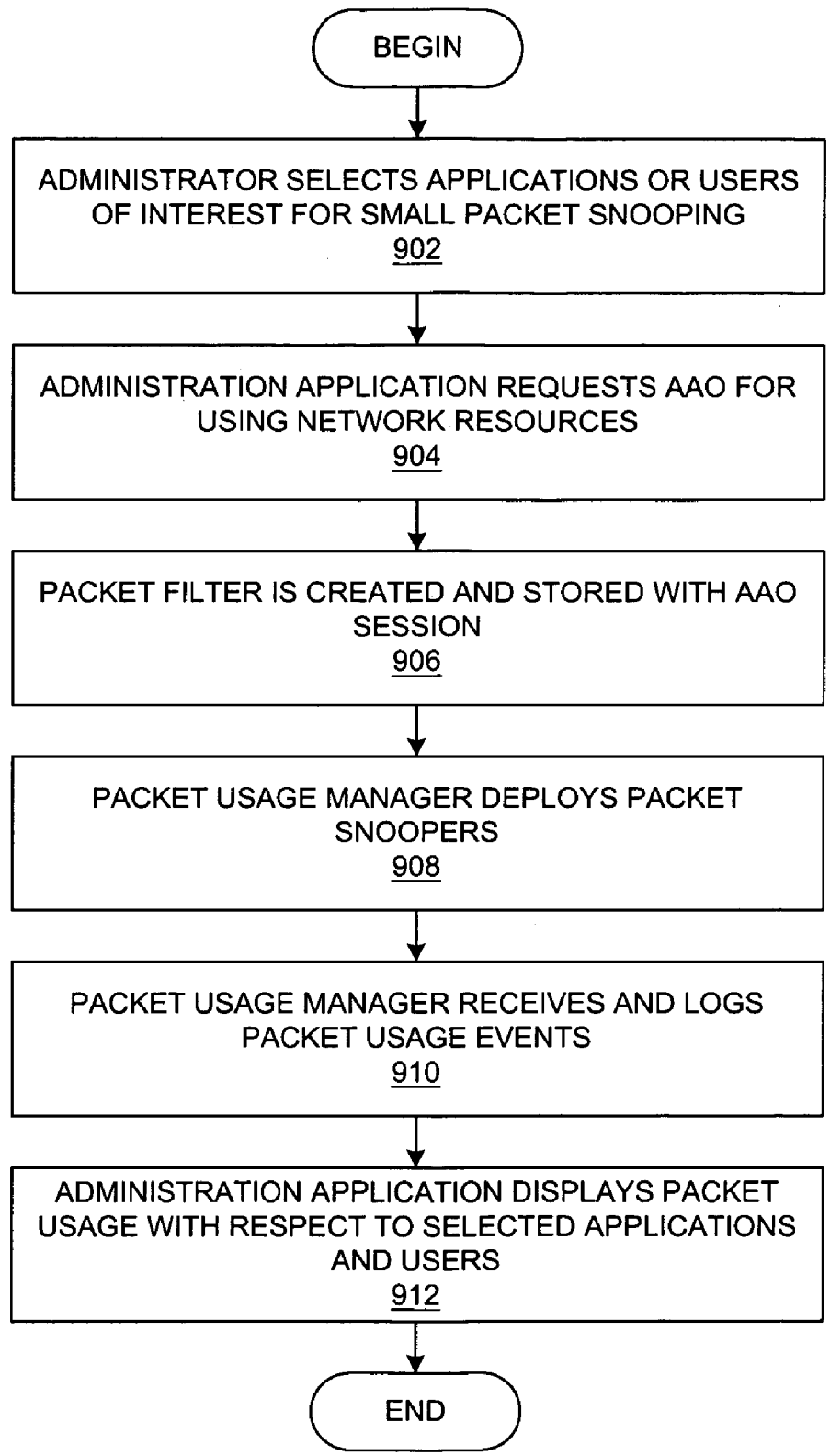
FIG. 9A is a flowchart depicting a process by which packet usage may be determined and presented to an administrator.

With reference now to FIG. 9A, a flowchart depicts a process by which packet usage may be determined and presented to an administrator. The process begins with a system administrator using an administration application to select those applications or users that are of interest to the administrator with respect to identifying sources/endpoints that are generating small packets, i.e. with respect to snooping for small packet usage (step 902). The administration application requests an application action object for using network resources (step 904); execution of the application object initiates packet snooping.

During the creation of the application action object, a packet filter is also created and stored with the application action object session (step 906). The Packet Usage Manager deploys packet snoopers to all endpoints on routes that are associated with a specified application or user of interest to the system/network administrator (step 908), as described in more detail in FIG. 9B. Eventually, the Packet Usage Manager then receives and logs packet usage events from the distributed packet snoopers (step 910). The administration application monitors the logging database for information to be displayed to its user, i.e. a system administrator. As packet usage events appear for applications or users as previously specified by the system administrator, the status of the packet usage is presented (step 912) so that the system administrator can perform administrative actions to control the user or application as required to prevent or limit the usage of small packets.

Figures 9B, 10:
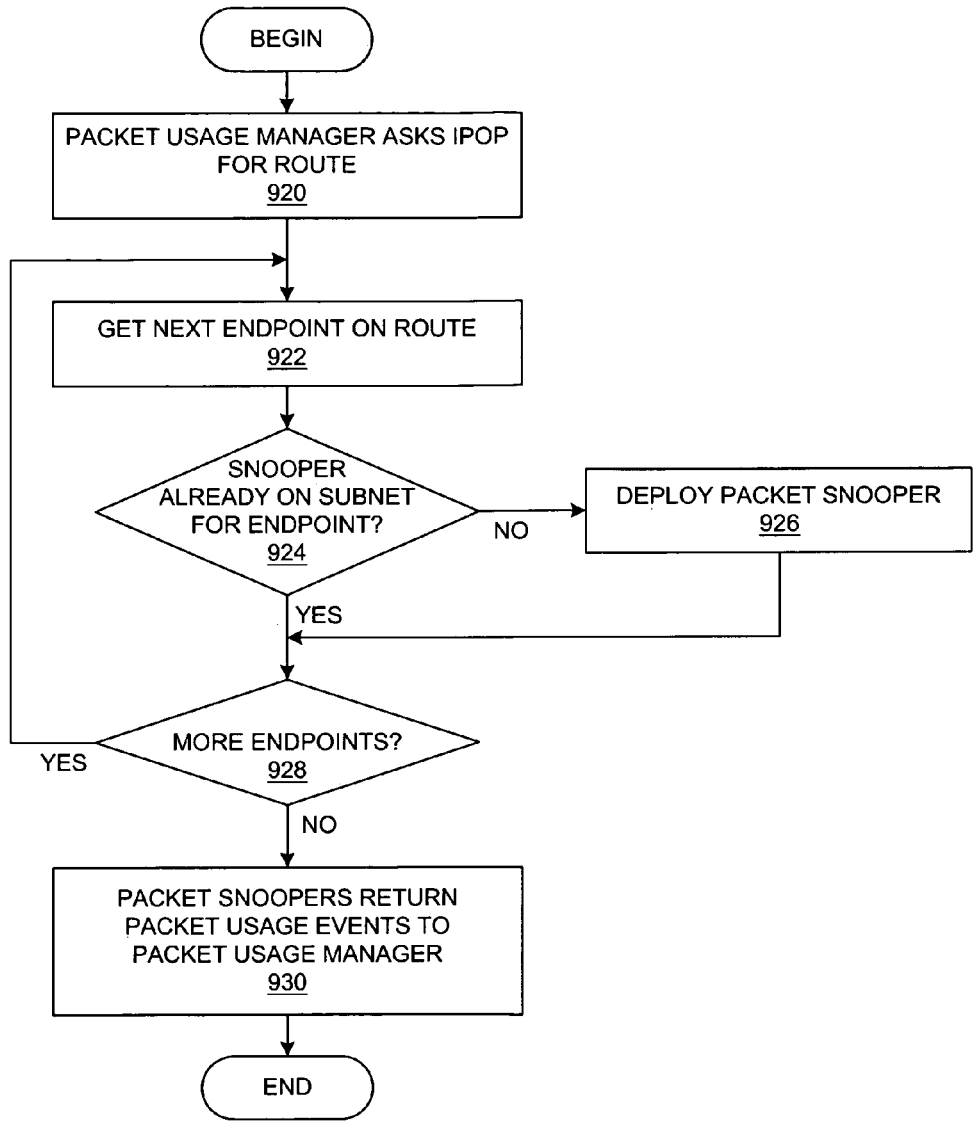
FIG. 9B is a flowchart depicting a series of steps that may be performed to acquire information about small packet usage.
FIG. 10 shows some simplified pseudo-code declarations for depicting an object-oriented manner in which bandwidth can be computed in accordance with a preferred embodiment of the present invention.

With reference now to FIG. 9B, a flowchart depicts a series of steps that may be performed to acquire information about small packet usage. The process begins with the Packet Usage Manager querying the IPOP database to obtain a route of endpoints associated with the application or user of interest to the system administrator for monitoring as a potential source of small packets (step 920). The Packet Usage Manager then loops through the set of endpoints; it gets the next endpoint in the route (step 922) and determines or queries whether a packet snooper has already been deployed to a subnet associated with the endpoint (step 924). If so, then another packet snooper is not required for that subnet as its packets would be sufficiently snooped by the deployed snooper, and the process continues.

However, if the subnet does not yet have a packet snooper, then the Packet Usage Manager deploys a distributed packet snooper for the subnet (step 926). In either case, a determination is made as to whether there is another unprocessed endpoint on the list of endpoints (step 928), and if so, then the process branches back to step 922 to process the next endpoint. If not, then the process continues by the distributed packet snoopers reporting packet usage events when a monitoring condition is triggered (step 930) so that the events can be logged for eventual presentation to a system administrator for possible selection of an appropriate action, and the process is then complete.

After the events are presented to the administrator, applications can be halted, paused, and restarted at the discretion of the administrator, as shown with respect to FIGS. 8A-8B. In order to take actions with respect to applications within the system, assuming that the present invention is implemented with an object-oriented methodology, as shown in FIG. 7B, application action objects may take advantage of a runtime environment that supports event listeners. An application action object may subscribe to events, and when certain events occur, such as an administrator-initiated action with respect to an application through the administrative GUI, an application action object receives notification of events that cause the application action object to perform an appropriate action. For example, an application action object may run a method that throws an exception back to an administrative module, or the application action object may terminate itself.

It should be noted that the administrative functionality may be performed through various GUI applications, as shown in FIGS. 8A-8B, or through various command line interfaces, batch programs, programs invoked automatically in response to detection of various conditions, etc. However, an administrative GUI facilitates many actions by a system administrator and allows dynamic presentation of system performance.

As packet snooping events are received and processed, statistics on packet utilization characteristics can be correlated with historical utilization characteristics so that trends may be presented to the administrator. Various types of graphs, histograms, etc., could be generated in real-time by tracking packet-related statistics and then presented through the administrative GUI. For example, a particularly useful statistic could be the percentage of payload utilization of a packet stream generated by a particular application, which may be merely one source of packets among many sources throughout the system. Using the present invention, the administrator may view a graph of the changes in payload utilization by the application, which might require snooping a particular type of packet used by the application among many types of packets used by the application, the sizes of the packets generated by the application, the number of packets generated by the application, the number of packets per application or protocol session, the amount of payload data in the packets, etc. These values can be compared over time to obtain data trends, and depending either manual thresholds set by an administrator or automatic detection by an application, various graphical, audible, or other types of alerts could be presented to the administrator.

In order to monitor all of the conditions, the administrator may also be provided with various GUI options for configuring the monitored conditions and parameters, although the monitored parameters and conditions could also be specified or determined by initialization files, configuration files, registry values, etc. Parameters could be specified for packet types, sizes, characteristics, and a variety of conditions. A minimum packet size threshold value could be specified that triggers an event if the packet size is below or equal to the specified value. A maximum packet size could be specified in which packets would not be analyzed or snooped for matching conditions if a packet from the source exceeded a particular threshold cut-off size. Parameters could be set for absolute packet numbers such that events would not be triggered unless a specific number of packets matching other criteria were generated, particularly when generated within a specific time period, which would prevent triggering an event if a small number of packets were generated that violated some other condition.

Conditions can be set in conjunction with other conditions such that multiple conditions must be satisfied prior to generating a packet snooping event. Moreover, each different type of network protocol may have its own associated set of parameter values and/or conditions to be monitored. For example, packet size may be significant only in comparison to the maximum available packet size, or packet payload utilization may only be significant over a number of packets or a period of time and not within any particular individual packet. In other words, it may be not only tolerable but expected that many applications have legitimate reasons for generating certain numbers of small packets or packets with relatively light payloads. However, the present invention is able to monitor for instances where applications act as packet sources in a manner that is unexpected or intolerable.

As an example, certain high-speed networks have more than enough bandwidth to tolerate small packets with relatively high overhead in comparison to actual payload data carried by a stream of packets. However, other networks, such as a pervasive wide-area network (WAN), employ certain types of protocols because such networks have lower throughput. Hence, the network has been designed and constructed to reduce the percentage of overhead data that is used to carry useful payload data. The protocol may have a large available payload size, such as one megabyte per packet, and it might be intolerable for an application to produce many packets that use only a small percentage of the available packet size. In this type of network, a small packet might be measured in many kilobytes, which is small in relative terms, whereas other network protocols may have a maximum packets size on the order of one kilobyte or less, in which case a small packet might be 64 bytes.

The Packet Usage Manager Service is able to determine packet usage statistics per user or per application if required or requested. As noted above, the Bandwidth Usage Manager Service is able to accumulate statistics from the reported packet snooping events to determine bandwidth consumed by user or application.

However, referring again to FIG. 7A, Bandwidth Usage Manager Service 752 interoperates with the Gateway Service and retrieves information from bandwidth usage database 756 and DKS logging database 722. Using session and AAO information, the Bandwidth Usage Manager Service is able to work with the Gateway Service to associate bandwidth usage statistics with an AAO session. The Bandwidth Usage Manager Service gets information about particular endpoints that were used in an AAO session and routes (collections of endpoints from the source endpoint of the AAO to the target endpoint). In this manner, the Bandwidth Usage Manager Service can compute other bandwidth-related metrics, such as: bits per endpoint in an AAO session; packets per endpoint in an AAO session; bits per route in an AAO session; and packets per route in an AAO session.

With reference now to FIG. 10, some simplified pseudo-code declarations are shown for depicting an object-oriented manner in which bandwidth can be computed in accordance with a preferred embodiment of the present invention. With the application action objects of the present invention, bandwidth consumed by the execution of an application action object can be associated with the application action object, including both actual consumed bandwidth, i.e. historical usage of bandwidth, and predicted consumption of bandwidth, which is described in more detail further below.

With reference now to FIG. 11A, a flowchart depicts the manner in which actual bandwidth consumption can be monitored in accordance with a preferred embodiment of the present invention. The process begins with an administrator of a management application requesting a packet snooping session (step 1102), similar to that explained above with respect to FIGS. 9A-9B. In this particular case, the Packet Usage Manager generates a packet filter for snooping all packets (step 1104). When the session terminates, the Bandwidth Usage Manager either receives the packet usage information from the Packet Usage Manager or is notified that the session has terminated and retrieves the required information from the DKS logging database (step 1106).

In either case, the bandwidth usage manager service computes bandwidth usage statistics from packet usage information (step 1108). By parsing the usage statistics for packet information from a common source, the bandwidth used by various entities or in various categories can be summed. By keeping a running total of the number of packets consumed and the number of bits consumed for each user, application, AAO, etc., an accurate report of bandwidth consumption at a fine level of detail emerges.

The bandwidth usage information is then stored in the bandwidth usage database by appropriate categorizes, such as user, application, and endpoints (step 1110). The process is then complete, and other applications may use the bandwidth usage metrics as necessary, such as other management or optimization processes or for billing purposes.

In addition, the metrics can be displayed to an administrative user of a system management application so that the consumption of resources by user or application can be monitored in real-time in various formats as appropriate to a particular user interface. If necessary, the administrator could restrict a user's or application's consumption of resources in order to meet quality-of-service guarantees for other users or applications.

With reference now to FIG. 11B, a flowchart depicts the manner in which bandwidth usage can be predicted or estimated in accordance with a preferred embodiment of the present invention. The process begins with the management application requesting a particular action that requires the generation of an application action object (step 1120). In response, the Gateway Service determines endpoints and routes for executing the application action object as required (step 1122). This information is then available to other services.

The Bandwidth Usage Manager Service also has access to the historical database of past statistics for bandwidth use categorized by user, application, and/or endpoints, as explained above. Hence, upon the generation of an AAO, the Bandwidth Usage Manager Service can begin querying the bandwidth usage database for historical bandwidth usage statistics that match the newly generated AAO (Step 1124). Moreover, the Bandwidth Usage Manager Service can query the database for various categories or characteristics of the newly generated AAO (step 1126). For example, the Bandwidth Usage Manager Service can query the database for the following information: a combination of application, user, and endpoint route; a combination of application and user; an application; a user; or an endpoint route.

As the data is retrieved, the Bandwidth Usage Manager Service can then compute predicted consumption of bandwidth for the selected action in various combinations of categories (step 1128), and the process is complete. In this manner, the stored predicted values can then be presented to an administrator.

More importantly, the Bandwidth Usage Manager is able to compute bandwidth usage predictions for an application action object within the system. In other words, a system administrator can receive bandwidth-related data in real-time and does not have to wait for a user or application to start exhibiting any particular behavior in order to adjust the system to restrict consumption resources, etc., as necessary to meet quality-of-service guarantees. With the fine level of detail of past information, network management tools can be used to quash applications or users for whom it is predicted that too much of a resource, such as bandwidth, might be consumed at a time that doing so would violate a quality-of-service guarantee to another application or user. Even if a user is not exhibiting "bad" behavior by performing actions against policies in what would otherwise be tolerable activities, the predicted needs of the user might conflict with other concurrent activities, and the network management framework of the present invention can then restrict certain resources, routes, uses of endpoints, etc., as necessary to ensure other quality-of-service guarantees.

Of course, if it can be predicted immediately, for instance, that a combination of a user, application, and endpoint violates some agreement between the customer and the service provider, then the management framework can also be used to quash the consumption of resources before it begins. For example, certain customers might purchase certain application services for a discounted evening rate; if the customers attempt to use the application during business hours, the use of the application could be terminated.

The bandwidth management of the distributed system is particularly advantageous because bandwidth management can be extended to the application level such that an application can become more properly behaved with respect to its own consumption of bandwidth and the overall state of the distributed system, including the bandwidth needs of other applications within the system. This is explained in more detail with respect to the remaining figures.

As noted previously, prior art service providers can be regarded as network-pipe providers; although the service provider may provide more than just a network connection, e.g., providing specific server-side applications at the end of the network pipe. Another perspective of these systems would be to describe the systems as "closed", i.e. a port-to-port system similar to client-server applications, such as a system for streaming and playing audio; one component sends the data and the other component plays the data.

A difficulty arises in the prior art, though, when many applications are performing bandwidth-consuming operations at the same time, e.g., many clients attempting to download and play audio data at the same time. A server that is streaming data to many clients at once typically implements a connection pool through which the server sends data to many clients. This approach is problematic because the demand may overwhelm the server such that the server may decide that certain requests cannot be satisfied in the manner in which they were requested. Because there is no interaction between the applications, e.g., the individual client-side players of the audio data, the applications cannot assist in alleviating the overall load in the distributed data processing system. For instance, using the audio example, the client-side players do not and cannot self-correct their use of the server's resources in order to aid other players that are having difficulty receiving data from the server.

As noted with respect to FIG. 11B, the bandwidth manager can produce bandwidth usage data. With the present invention, a management application may use the bandwidth-related data for various management purposes; however, an application may also use the bandwidth-related data from the bandwidth manager to self-modify or manage its behavior as described below.

Figure 12:
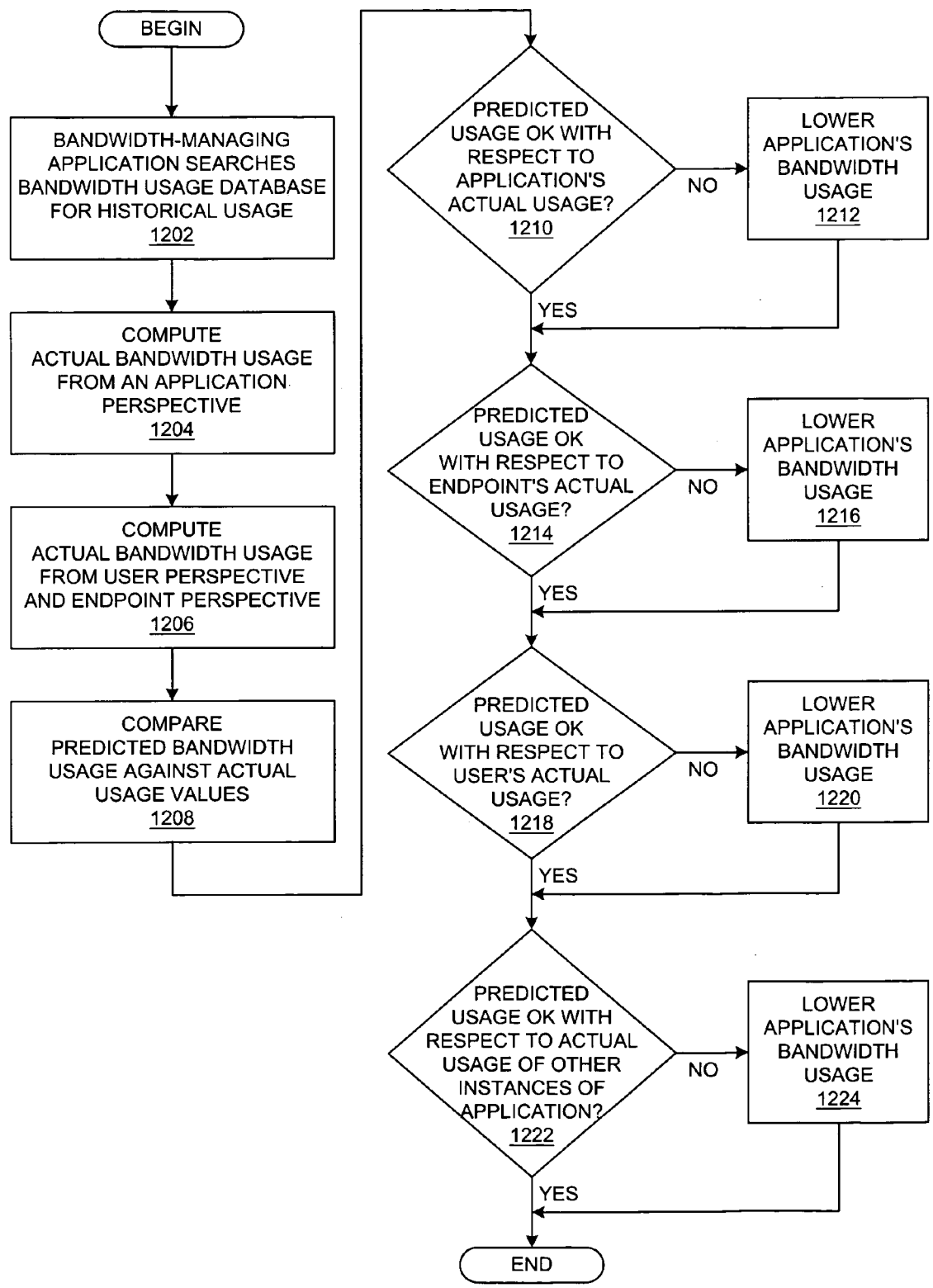
FIG. 12 is a flowchart depicting a process by which an application containing bandwidth-usage-awareness can receive bandwidth-related data to determine whether to modify its actions with respect to the consumption of bandwidth in accordance with a preferred embodiment of the present invention.

With reference now to FIG. 12, a flowchart depicts a process by which an application containing bandwidth-usage-awareness can receive bandwidth-related data to determine whether to modify its actions with respect to the consumption of bandwidth in accordance with a preferred embodiment of the present invention. A bandwidth-knowledgeable application is an application within the distributed data processing system that contains logic for self-correcting or self-modifying its bandwidth behavior, i.e. a bandwidth-managing application. The process begins with the bandwidth-knowledgeable application requesting a particular action that requires the generation of an application action object, as is normal with the distributed data processing system of the present invention. In response, the Gateway Service determines endpoints and routes for executing the application action object as required. This information is then available to other services.

The bandwidth-knowledgeable application also has access to the historical database of past statistics for actual bandwidth use categorized by user, application, and/or endpoints, as explained above. Hence, upon the generation of an application action object, in order to predict what the application action object's bandwidth usage might be, the bandwidth-knowledgeable application can begin searching the bandwidth usage database for historical bandwidth usage statistics that match the newly generated AAO for various combinations of application, user, and/or endpoint (step 1202), such as: a combination of application, user, and endpoint route; a combination of application and user; an application; a user; or an endpoint route.

In particular, the bandwidth-knowledgeable application can compute its actual bandwidth usage from an application perspective (step 1204) and the actual usage of bandwidth with respect to a matching user (user perspective) and a matching endpoint (endpoint perspective) (step 1206).

The bandwidth-knowledgeable application then compares its predicted usage of bandwidth versus its actual usage, the bandwidth usage of all the applications running on the endpoint, the bandwidth usage of all the applications being executed by the user, or the bandwidth usage of all the instances of itself running in the DKS system (accumulated totals from all endpoints in system) (step 1208). Comparisons may be made to configurable threshold parameters available to the application by system default, or an administrator can modify the system's default threshold values.

A series of determinations are made as to whether the bandwidth-knowledgeable application's comparisons should result in a decision to modify its own behavior. For example, a determination is made as to whether the application's own predicted usage is allowable in comparison to its own actual usage (step 1210). If not, then corrective action is taken to lower the application's bandwidth usage (step 1212), but if so, the process continues. Referring again to the audio player example, this decision basically ensures that this particular instance of the audio player is not consuming too much bandwidth-related resources.

In either case, another determination is made as to whether the application's own predicted usage is allowable in comparison to the endpoint's actual usage (step 1214). If not, then corrective action is taken to lower the application's bandwidth usage (step 1216), but if so, then the process continues. Referring again to the audio player example, this decision basically ensures that this particular endpoint on which the audio player is executing is not consuming too much bandwidth-related resources as a whole for the endpoint.

In either case, another determination is made as to whether the application's own predicted usage is allowable in comparison to the user's actual usage (step 1218). If not, then corrective action is taken to lower the application's bandwidth usage (step 1220), but if so, then the process continues. Referring again to the audio player example, this decision basically ensures that this particular user is not consuming too much bandwidth-related resources.

In either case, another determination is made as to whether the application's own predicted usage is allowable in comparison to the usage by all instances of this application that are operating within the distributed data processing environment (step 1222). If not, then corrective action is taken to lower the application's bandwidth usage (step 1224), but if so, then the process is complete. Referring again to the audio player example, this decision basically ensures that all instances of the audio player application are not consuming too much bandwidth-related resources; the service provider may place a limit on the amount of bandwidth-resources that are allowed to be consumed by this type of application such that the service provider's bandwidth and infrastructure can be used for other purposes that may have a higher priority or may generate more income.

It should be noted that the adaptive, corrective actions that an application performs may include the same ones that are requested manually by the administrator, such as pausing or stopping an application in addition to actions that might be appropriate to the application, such as an automatic lowering of data transfers over time. In this manner, an application can become aware of bandwidth-related information, such as packet sizes and bandwidth utilization factors, within a distributed million-endpoint environment such that it can self-correct its use of resources in order to accommodate various goals of a service provider, including quality-of-service goals.

As should be apparent, the management control and monitoring capabilities of the present invention allow the applications within the system to have intelligence such that the system administrators can delegate certain management goals within the applications themselves that are distributed throughout the system. In particular, applications can modify their behavior with respect to bandwidth such that bandwidth is conserved according to particular rules. For example, if a customer leases the use of a particular application that needs a particular amount of bandwidth, then other applications can give deference to that particular application. If a particular user purchases a higher quality-of-service for a particular application such that the application should receive more bandwidth-related resources when requested, then other applications can be tuned such that this occurs.

The advantages of the present invention should be apparent in view of the detailed description of the invention that is provided above. Badly behaved applications consume all of the bandwidth and memory of on endpoint such that other applications cannot perform any work. In prior art systems, restricting resources has generally required manual, static configuration of all possible applications at any given endpoint. Hence, it has been difficult to obtain accurate quality-of-service measurements at the application level, especially in a dynamic, runtime manner. Prior art systems have derived bandwidth measurements from network latency or network response times and operating system level response times. Although helpful, in a service provider environment, such measurements do not provide the operational network visibility that is required to ensure quality-of-service guarantees.

The present invention provides a network management framework that has the ability to restrict the use of endpoint resources along network routes after receiving indications that an endpoint is behaving badly in a manner that is disrupting network performance or quality-of-service policies or guarantees. Network performance can then be improved by removing certain applications or users.

Bandwidth can be reserved exclusively for the use of customers or applications that have contracted for high levels of service. A service provider can offer scaled compensation models to customers such that the customers would be charged based on various levels of service, including exclusive use of resources for variable periods of time if necessary. The network management system of the present invention allows QOS guarantees to be provided and verified.

Current bandwidth detecting mechanisms in the prior art are inadequate to detect inadequate sharing of bandwidth at the application level for remote system administration or management software that is attempting to ensure adequate bandwidth for all endpoints. Closed systems guarantee a specific response, but future open systems for allowing multiple service providers to send streaming audio and video to households, including multiple points within a single household, must have finer bandwidth utilization statistics and monitoring. The present invention allows accurate, real-time statistics to be generated and presented to system administrators on an endpoint basis. More importantly, applications can have built-in intelligence for adaptive behavior with respect to its state and various characteristics of the state of the environment.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing bandwidth within a distributed data processing system, the method comprising:
    establishing a bandwidth history comprising bandwidth usage data associated with multiple entities within the distributed data processing system, wherein an entity within the distributed data processing system is a user or an application;
    in response to a requested action within the distributed data processing system, predicting bandwidth usage by the requested action;
    deriving a set of logical routes from a network topology mapping, wherein each logical route is a series of endpoints that comprise an endpoint-to-endpoint route for completing the requested action;
    in response to a request by the administrative user, dynamically deploying packet snooper objects in association with a packet filter object along the set of logical routes throughout the distributed data processing system, wherein the packet filter object specifies packet types or packet sizes to be snooped;
    executing the dynamically deployed packet snooper objects at devices along the set of logical routes to monitor bandwidth usage; and
    receiving bandwidth usage data from the dynamically deployed packet snooper objects.

2. The method of claim 1 further comprising:
    snooping network packets from multiple sources within the distributed data processing system;
    filtering the network packets against multiple filter parameters, wherein a filter parameter comprises a user identifier, an application identifier, an endpoint identifier;
    reporting packet snoop data to be associated with the requesting entity;
    computing bandwidth usage data from the packet snoop data; and
    storing the bandwidth usage data as the bandwidth history.

3. The method of claim 1 further comprising:
    displaying the predicted bandwidth usage for the requested action to the system administrator.

4. The method of claim 1 further comprising:
    querying the bandwidth history by the application that generated the requested action.

5. A method for managing bandwidth within a distributed data processing system, the method comprising:
    establishing a bandwidth history comprising bandwidth usage data associated with multiple entities within the distributed data processing system, wherein an entity within the distributed data processing system is a user or an application;
    in response to a requested action within the distributed data processing system, predicting bandwidth usage by the requested action;
    selecting, by an administrative user, a user to be monitored for bandwidth usage;
    generating a packet filter object containing a packet filtering parameter that identifies the selected user;
    in response to a request by the administrative user, dynamically deploying packet snooper objects in association with the packet filter object to a set of devices throughout the distributed data processing system;
    executing the dynamically deployed packet snooper objects at the set of devices to monitor bandwidth usage by the selected user with respect to a given device or a given subnet; and
    receiving bandwidth usage data from the dynamically deployed packet snooper objects.

6. The method of claim 5 further comprising:
    inserting a packet filtering parameter in the packet filter object that specifies a packet type to be snooped.

7. The method of claim 5 further comprising:
    inserting a packet filtering parameter in the packet filter object that specifies a packet size to be snooped.

8. A method for managing bandwidth within a distributed data processing system, the method comprising:
    establishing a bandwidth history comprising bandwidth usage data associated with multiple entities within the distributed data processing system, wherein an entity within the distributed data processing system is a user or an application;
    in response to a requested action within the distributed data processing system, predicting bandwidth usage by the requested action;
    selecting, by an administrative user, an application to be monitored for bandwidth usage;
    generating a packet filter object containing a packet filtering parameter that identifies the selected application;
    in response to a request by the administrative user, dynamically deploying packet snooper objects in association with the packet filter object to a set of devices throughout the distributed data processing system;
    executing the dynamically deployed packet snooper objects at the set of devices to monitor bandwidth usage by the selected application with respect to a given device or a given subnet; and
    receiving bandwidth usage data from the dynamically deployed packet snooper objects.

9. The method of claim 8 further comprising:
    inserting a packet filtering parameter in the packet filter object that specifies a packet type to be snooped.

10. The method of claim 8 further comprising:
    inserting a packet filtering parameter in the packet filter object that specifies a packet type to be snooped.

* * * * *